United States Patent

Ooi et al.

[11] Patent Number: 5,940,853
[45] Date of Patent: Aug. 17, 1999

[54] RECORDING AND REPRODUCING APPARATUS ENABLING MODIFICATION OF DATA RECORDED ON A NON-ERASABLE RECORDING MEDIUM

[75] Inventors: Yuji Ooi, Hiroshima; Akitoshi Tezuka, Niihama, both of Japan

[73] Assignee: Matsushita Electric Industrial Co., Ltd., Osaka-fu, Japan

[21] Appl. No.: 08/802,352

[22] Filed: Feb. 21, 1997

[30] Foreign Application Priority Data

Feb. 23, 1996 [JP] Japan .................................. 8-36125

[51] Int. Cl.$^6$ .................................................. G06F 12/00
[52] U.S. Cl. ........................................... 711/111; 235/454
[58] Field of Search ................................ 369/58, 32, 54, 369/47, 48; 235/454; 360/48; 711/111

[56] References Cited

U.S. PATENT DOCUMENTS

| | | | |
|---|---|---|---|
| 4,849,956 | 7/1989 | Aizawa | 369/58 |
| 4,982,074 | 1/1991 | Ogasawara | 235/454 |
| 5,446,857 | 8/1995 | Russ | |
| 5,475,668 | 12/1995 | Azumatani et al. | 369/58 |
| 5,687,397 | 11/1997 | Ohmori | 395/893 |

*Primary Examiner*—John W. Cabeca
*Assistant Examiner*—Mehdi Namazi
*Attorney, Agent, or Firm*—Greenblum & Bernstein P.L.C.

[57] ABSTRACT

A recording apparatus is provided for recording data and block units together with management information for the block units of data as a track in the recording area of a non-erasable recording medium. The apparatus detects the recording status of the non-erasable recording medium. Based upon the detected recording status, the apparatus reserves a particular part of the track for recording management information. The apparatus records the management information in the reserved recording area.

23 Claims, 14 Drawing Sheets

RECORDING AND REPRODUCING APPARATUS ENABLING MODIFICATION OF DATA RECORDED ON A NON-ERASABLE RECORDING MEDIUM

BACKGROUND OF THE INVENTION

1. Field of the Invention

The present invention relates to a recording and reproducing apparatus for a non-erasable recording medium.

2. Description of the Prior Art

Non-erasable recording media, i.e., recording media to which data can be written but once written cannot be removed or overwritten, are used because of their large storage capacity for recording large amounts of information that does not require much modification after completion. Examples of such information include official public documents, standards, and master data files, encyclopedia, and databases that are recorded to CD-ROM. Regardless of how infrequent the need for revision may be, however, it is obvious that the very nature of information makes appending, modifying, and otherwise updating the information to the most up-to-date content extremely desirable. This is particularly true when using such media to distribute such documents as standards and encyclopedia.

However, when data that is different from the data that has already been recorded must be appended, the already-recorded data must be re-recorded together with the new data because data cannot be overwritten with non-erasable recording media, or non-erasable media. In other words, the same data is redundantly recorded to another location on the same non-erasable medium. This is also true when only part of the already-recorded data is modified in addition to re-recording the data that changed, the unchanged data is also redundantly re-recorded.

These types of non-erasable media include CD-R (Compact Disc Recordable) media that can be reproduced on CR-ROM drives conforming to the so-called Red Book standards for audio CDs and the Yellow Book standards for data CD-ROMs, and CD-WO (Compact Disc Write Once) media defined in the Orange Book.

The non-erasable CD-R medium is defined in the Orange Book, which also defines the CD-E (Compact Disc Erasable) and CD-RW (Compact Disc Rewritable) rewritable media standards whereby information can be recorded and erased or overwritten. A recording apparatus that uses a 300 mm diameter optical disc medium called a WORM (Write Once Read-only Memory) is also defined in IEC-13614. In addition to these non-erasable media based on the CD-ROM standard, there is DVD-R, which is based on DVD.

Note that the Red Book, Yellow Book, and Orange Book have been standardized by the International Electrotechnical Commission (IEC) as IEC-908, IEC-10149, and IEC-13490.

The structure and recording method of CD-R media are described briefly below with reference to FIG. 19, FIG. 20, and FIG. 21 as one example of non-erasable media. Note that to produce a CD-R disc that is reproducible on an existing CD-ROM drive it is necessary to satisfy the physical format specifications defined in the Yellow, Red, and Orange Books as well as the logical format defined in ISO-9660.

As shown in FIG. 19, a lead-in area 302 to which is recorded the lead-in information Li is formed near the inside circumference of the disc, and a lead-out area 306 is provided near the outermost circumference of the disc. The user-data area 304 used by the user for recording any user data UD is disposed between the lead-in area 302 and lead-out area 306. This is because a lead-out area must be recorded on the outside circumference side adjacent to the recorded user data; so that the lead-out information Lo can be recorded even if data is recorded to the full capacity of the user data UD, a lead-out area 306 not included in the user-data area 304 is reserved at the outside circumference of the CD-R disc.

If there is sufficient unrecorded space in the user-data area 304, the lead-out information Lo is recorded following the user data UD recorded to the user-data area 304, and a new lead-out area Lo is formed separately to the reserved lead-out area. Only when there is not sufficient space in the user-data area 304, e.g., only when the user-data area 304 is substantially completely used for user data UD recording, is the lead-out information Lo recorded to the reserved lead-out area 306.

In an audio CD the user-data area 304 is divided into tracks as the unit area to which the data for one selection is recorded. Division into track units is not necessary when recording computer data, however, and the user-data area 304 therefore normally consists of only one track. In other words, the user-data area 304 may comprise from 1 to 99 tracks. A table of contents (TOC) containing information relating to each track is recorded to both the lead-in area 302 and lead-out area 306.

To the inside circumference side of the lead-in area 302 is also formed a PMA (Program Memory Area) area 300 to which track information is recorded.

Each of these areas is recorded as a single data stream extending in a spiral pattern from the inside circumference to the outside circumference. Note also that a special information SP area 900 is also provided at a fixed position on the disc as shown in the figure. The SP area 900 stores the starting position of the PMA area, the starting position of the PCA area used for recording power tests, the disc capacity, and the disc capacity and other special information SP.

A typical illustration of the storage area of a CD-R disc showing the spiral data stream stretched into a straight line is shown in FIG. 20. As shown in FIG. 20, the user-data area 304 and the lead-in area and lead-out area containing the TOC for the user-data area 304 formed on a single disc constitute one session S. In addition, a session in which the lead-in area and lead-out area are the reserved lead-in area 302 and lead-out area 306 is also called a session 308.

A CD-ROM drive reads the TOC information from the lead-in area 302 (Li) or the lead-out area 306 (Lo), or both, to obtain the track information for the disc. The user data UD is recorded as a track to the user data area, and for the reasons described above the lead-in information Li and lead-out information Lo must be recorded before and after, respectively recording the lead-in area and lead-out area to complete a session.

However, when the user data that is actually recorded is smaller than the recording capacity of the reserved user data recording area 306, the lead-out area Lo is recorded inside the user-data area 304 shown in FIG. 19, i.e., is recorded to the inside circumference side of the lead-out area 306, because the lead-out information Lo must be recorded contiguously from the end of the user data.

Recording media such as the CD-R disc in which one session S is formed per recording side are therefore called "single session" media. Note that in this case nothing is recorded to the reserved lead-out area 306.

It is also possible to record a new session to the blank part of the user-data area 304 and record separate user data to this new session. It is thus possible to form plural sessions S in the user-data area 304 insofar as capacity permits. Note, however, that there is a maximum limit of 99 tracks. Because each session S must contain at least one track, the maximum number of sessions S is also 99. However, capacity limitations mean that the maximum actual number of sessions possible is about 40. There are also only 100 Power Calibration Areas (PCA) available for use before recording. Because laser power adjustment is not always necessary, however, there is no upper limit on the number of packet recordings.

Media on which plural sessions are thus formed and recorded are called "multi-session" media.

The data stream of a multi-session recording medium is shown in FIG. 21 stretched into a straight line as in FIG. 20. In this example two sessions S1 and S2 are recorded to one CD-R disc. The entire first session S1, including the lead-in area Li1 302, the user data area UD1, and lead-out area Lo1, and the lead-in area Li2 and user data area UD2 of the second session S2, are recorded to the user-data area 304 shown in FIG. 20.

The reserved lead-in area 302 is used for the lead-in area Li1 of the first session S1, and the reserved lead-out area 306 is used for the lead-out area LO2 of the second session S2. As described above, however, more than two sessions can be formed, and the lead-out area Lo of the final session can obviously be formed separately from the reserved lead-out area 306.

One method of recording plural times to a non-erasable optical CD-R disc is to record a complete session conforming to the ISO-9660 format as described above. This method of recording by forming plural sessions on a single CD-R disc is called "multi-session recording." One method of reading data from a multi-session recorded disc is the Photo CD method.

Note that the method of recording by forming a single session on a single CD-R disc is called "single session recording."

To record without forming sessions it is necessary to use a logical format other than ISO-9660. One such format is the ECMA168 format standardized by the European Computer Manufacturers Association (ECMA).

As described with reference to FIG. 19, FIG. 20, and FIG. 21 it is possible with a CD-R disc to record the lead-in area and lead-out area to the disc after recording the user data to a specific track on the disc to complete a session. To accomplish this the PMA is used to store the track information until the session is completed. The PMA is a reserved area near the innermost circumference of the disc for storing the track information. By recording the track information to the PMA each time a track is recorded on the disc, it is possible to manage what data is recorded to what part of the track on the disc.

It is also possible to keep a particular part of the user data area blank by recording to the PMA the track information for tracks to which no data is actually written. This process of holding a particular area of the track is called "reserving" a track, and a disc area to which no data is actually recorded but for which the track information is recorded to the PMA is called a "reserved track."

By thus appropriately writing track information to the PMA, it is possible to manage the tracks in the recording area of the disc as recorded tracks, the next tracks to be recorded, i.e., blank user data area, and reserved tracks.

Note that the track information contains the disc ID, copy information indicating whether data duplication is permitted, the physical format, track numbers, and track starting positions. In addition to the track information, the PMA also contains track end point information.

Except for the lead-in area and lead-out area, the CD-R disc must conventionally be recorded without interruptions in the data from the inside circumference to the outside circumference of the disc, i.e., through the user data area. However, it is also possible by reserving a track to keep a blank user data area on the inside circumference side of the recorded area of the disc. Data can be recorded to this reserved track at any time before a session is created. The TOC is also redundantly recorded to the lead-in area and the lead-out area.

ISO-9660, which defines the logical format of a CD-ROM, specifies that a Primary Volume Descriptor (PVD) area be recorded to sector 17 from the beginning of the user data area of a session. Sectors 0–15 are reserved as a system area, the use of which is not defined by ISO-9660. The address of the table managing information about the files recorded to the disc is recorded to the PVD.

The structure of the PVD in a single session medium is shown in FIG. 22. The PVD contains the size of the volume space VPS (Volume Space Size), the size of the path table PTS (Path Table Size), the path table location LPT (Location of Path Table), and the directory record RED (Root Directory Entry) for the root directory.

The path table PT contains, as shown in FIG. 22, the Length of Directory Identifier, Extended Attribute Record length, Location of Extent, Parent Directory Number, and Identifier information.

The Root Directory Record RDI contains the Length of Directory Record, Extended Record Length, Location of Extent, Data Length, date, File Flags, File Unit Size, Volume Sequence Number, Length of File Identifier, and the File Identifier information. These elements cannot be generated before or after recording, and must be stored simultaneously to recording the data and file.

The file name, file size, and other file information can be obtained by tracing the Directory Record DI, which is a reference tree of all files and directories. This Directory Record DI contains information about all subdirectories and files in the directory. The disc directory is referenced to access a particular file on a CD-ROM or CD-R disc. More specifically, the Directory Record DI, which is a directory information recorded on the disc, must be read to obtain the address recorded for the desired information. In other words, to reproduce the file storing the contents of the disc after recording, the information that must be contained in the Directory Record DI must be stored with the data.

The Path Table PT has been defined as a means of compensating for the slow access speed of CD-ROMs and the characteristics of CD-R discs. This means that to access directories ¥111¥222¥ . . . ¥999, nine seek and reproduce operations are needed to trace the Directory Record DI from the root. Because both seeking and reading are slow with a CD-ROM, a Path Table PT is provided to compile the directory records for all directories into a table that can be referenced to directly obtain the location of the target directory record. As a result, the overall table size is variable until it is decided that no more data will be recorded, at which time it is first possible to fix the user data content to be recorded to the Path Table PT. The table address must, however, be stored to the PVD.

Neither the Root Directory Record RDI nor the Path Table PT can be generated until the data files recorded to the disc and the directories are fixed. As a result, the PVD can also only be generated after the PVD information for the session shown by way of example in FIG. 22 is fixed.

However, the PVD must be recorded to a fixed position according to the ISO-9660 standard, specifically to sector 17 from the beginning of the user data area immediately following the lead-in area. It is therefore not possible to record the PVD to disc until all user data to be recorded for a session is fixed. This means that one recording to the disc must be one session where "one recording" is defined as from the beginning to the end of one recording operation by the recording apparatus to the non-erasable media based on a user command. One recording is therefore unrelated to the number of recorded files and size, and is also unrelated to the number of laser emissions to the disc. It is possible to append the user-data area 304 after the PVD is recorded, but the appended data will not be contained in the logical format expressed by the PVD, and the appended data can therefore not be read as a file.

In other words, once recording to a CD-R disc has begun, it is necessary to finish recording to the end to complete a session. It is not possible to interrupt recording, use the CD-R disc, and then at a later date finish recording the rest of the interrupted recording or record new data. It should be noted, however, that the lead-in area and lead-out area can be generated from the PMA, and can therefore be recorded after recording is ended.

The arrangement of the recording area in a Photo CD format CD-R disc after once appending to the recording area as shown in FIG. 21 is shown in FIG. 23 for a disc recorded with the packet writing method defined in the Orange Book. As described with reference to FIG. 22, the first session S1 contains following the lead-in area Li1 a Primary Volume Descriptor PVD1 storing the address of the table managing the information for the file F1 recorded in this session to user data UD1. Format information Fi1 describing the directory structure and the user data file F1 (UD1) is recorded between PVD1 and user data area UD1. The second session S2 likewise contains lead-in area Li2, PVD2, format information Fi2, user data UD2 (file F2), and lead-out area Lo2.

However, because format information Fi2 contains information for both user data UD1 (F1) and user data UD2 (F2), lead-in area Li1, PVD1, format information Fi1, and lead-out area Lo1 are invalid areas never used by the CD-ROM drive. For descriptive convenience the sizes of the lead-in areas and lead-out areas are not shown accurately in the figure. In practice, however, the lead-in area Li is from 10–25 megabytes (MB), and the lead-out area Lo is 5–15 MB, large in comparison to the normal file size, and the majority of the disc is consumed by information other than the actual files.

The arrangement of the recording area in a Photo CD format CD-R disc after once appending to the recording area as shown in FIG. 21 is shown in FIG. 23 for a disc recorded with the track-at-once method defined in the Orange Book. As described with reference to FIG. 22, the first session S1 contains following the lead-in area Li1 a Primary Volume Descriptor PVD1 storing the address of the table managing the information for the file F1 recorded in this session. Format information Fi1 describing the directory structure and the user data file F1 (UD1) is recorded between PVD1 and user data area F1 (UD1). The second session S2 likewise contains lead-in area Li2, PVD2, format information Fi2, user data F2 (UD2), and lead-out area Lo2.

As with multi-session recording using the packet writing method shown in FIG. 23, the majority of the disc is consumed by information other than the actual files.

It is thus necessary with Photo CD format multi-session recording to complete a session and also record a TOC area separately from the recorded data. This means that in addition to the extra processing time required for session formation and TOC recording, significant recording capacity equal to approximately 2% to 6% of the disc capacity is consumed outside the data area each time data is appended.

In addition, when a disc recorded with plural sessions is accessed on a CD-ROM drive that is not compatible with multi-session Photo CD discs, the drivers firmware can only read the first session, and it is not possible to reproduce the second and subsequent appended sessions.

Furthermore, even with drives that can reproduce discs containing plural sessions, there is a noticeable delay resulting from processing after the disc is inserted. A logical format standard in which sessions are not formed cannot be used with software, including drivers and utilities, implementing the existing CD-ROM file system.

Moreover, as a general problem with non-erasable media, even when data separate from the already-recorded data is newly appended and recorded, the same data must be redundantly recorded to a separate location on the same non-erasable media. This means that the utilization efficiency of the medium's recording area is significantly impaired.

Therefore, in consideration of the aforementioned problems of the prior art, an object of the present invention is to provide a recording and reproducing apparatus for non-erasable media capable of resolving or significantly reducing the problems of redundantly recording the same data when appending data to a non-erasable medium, and to thereby improve the utilization efficiency of the recording area, and which is more specifically capable of shortening recording time, conserving recording capacity, shortening the startup time during recording and reproduction, and enabling reproduction on a single session compatible drive.

SUMMARY OF THE INVENTION

To achieve the above object, the present invention provides a recording apparatus for non-erasable media, and a recording method therefor, where the recording apparatus records data in block units together with management information for the data in said block units as a track in the recording area of a non-erasable medium, and comprises a status detection means for detecting the recording status of the non-erasable media, a means for reserving a particular part of said track for recording the management information based on the detected recording status, and a means for recording the management information to the reserved recording area.

The invention further provides a non-erasable media reproduction apparatus for reproducing recorded data from non-erasable media recorded by the recording apparatus of the invention, and comprising a first recording status detection means for detecting at least whether the recording status of the non-erasable media is unrecorded or non-reproducible, and a second recording status detection means for detecting at least one of the following states: whether the recording status of the non-erasable media is non-recordable but is reproducible, whether recording is not possible but reproduction is possible, and whether the outside of the above first and second track information storage means is recordable and reproducible.

The invention further provides a non-erasable medium recorded by the recording apparatus of the invention wherein the recorded file and directory information required for data reproduction is management information recorded with the data in the recording blocks, and is not the format information of the ISO-9660 standard.

DETAILED DESCRIPTION OF THE PREFERRED EMBODIMENTS

The preferred embodiments of the present invention are described below.

The basic operating principle of the recording method of a non-erasable medium according to the present invention when applied to a CD-R disc is described below using the packet writing and track-at-once recording methods defined by the Orange Book standard established for non-erasable optical CD-R media to accomplish any particular number of recordings within one session.

Figure 20:
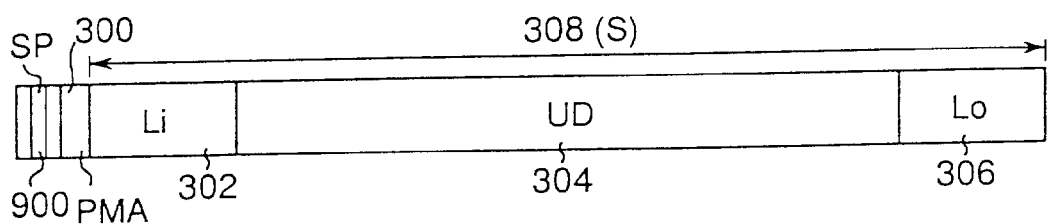
FIG. 20 is a typical view of the recording area shown in FIG. 19 stretched into a straight line, A typical illustration of the recording area after multi-session recording to the non-erasable media shown in FIG. 21.
Figure 21:
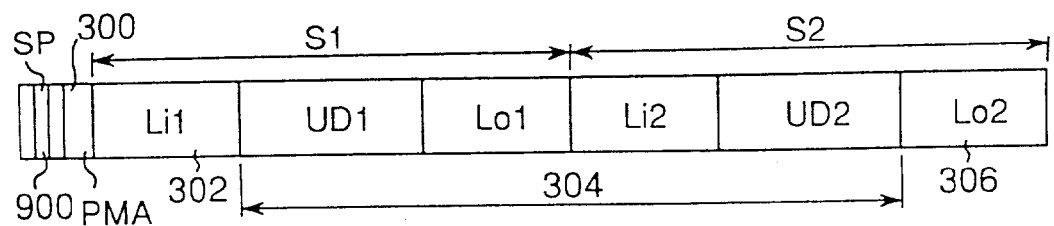

Recording any particular number of times during one session using the packet writing method is described first with reference to FIG. 9, FIG. 10, FIG. 11, FIG. 12, FIG. 13, and FIG. 14. FIG. 9, FIG. 10, FIG. 11, FIG. 12, FIG. 13, and FIG. 14 show the recording area of the CD-R disc stretched into a straight line from the lead-in area 302 at the inside circumference area to the lead-out area 306 at the outside circumference area as shown in FIG. 20.

Figure 9:
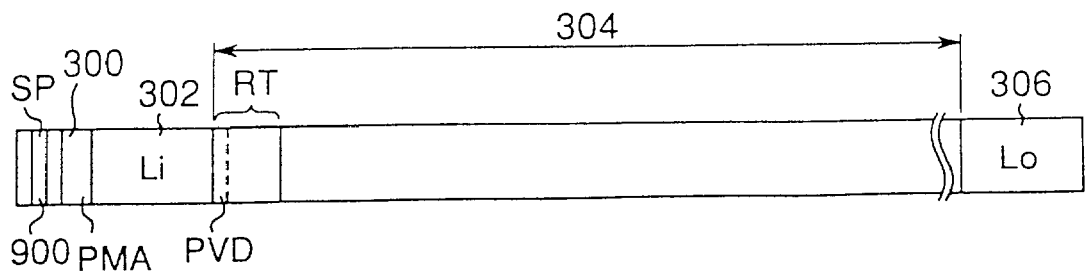
FIG. 9 is a typical illustration of the structure of the recording area in a packet writing method when a track on the non-erasable media has been reserved based on the non-erasable media recording method according to the present invention.

FIG. 9 shows the condition when a track is reserved to assure a track area for recording the logical format of the data to be recorded. To accomplish this the address of a particular area in the track following the lead-in area 302 is written to the PMA on the inside circumference side of the lead-in area 302 to generate a reserved track RT for recording the PVD when a session is created after recording is completed. In the ISO-9660 standard only the PVD declares locations within a session. Because the size of the PVD is fixed, it is sufficient for the reserved track RT to be longer than the PVD. However, because the minimum track length defined by the Red Book is longer than the fixed PVD length defined by the ISO-9660 standard, it is sufficient to reserve a track of the length satisfying the Red Book standard. Note that the area of the unrecorded PVD is indicated by the dotted line in the reserved track RT.

Figure 10:
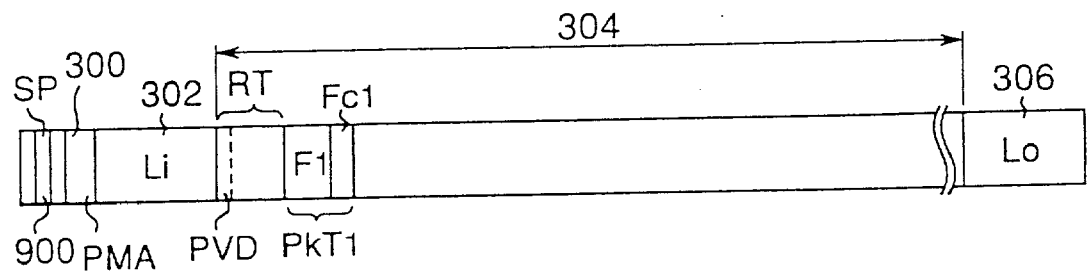
FIG. 10 is a typical illustration of the structure of the recording area when data has been appended once to the non-erasable media shown in FIG. 9.

FIG. 10 shows the condition of the recording area when the user data file F1 has been recorded as the first recording to the CD-R disc on which a track has been reserved as shown in FIG. 9. It should be noted that all writing, i.e., recording, to a non-erasable medium is defined in this specification as "appending" in that overwriting is impossible. Still referring to FIG. 10, the file F1 and management data FC1, containing the contents of file F1 and management information known as a "directory," are recorded following the reserved track RT. A packet PKT1 is thus formed by the proprietary method of the invention combining the user data file F1 and corresponding management data FC1.

The Orange Book defines the physical format for recording data to disc, but does not define the logical format of the data written to the formatted recording area. In other words, the packet PKT1 generated according to the proprietary logical format of the invention is recorded to a CD-R disc conforming to the Orange Book standard. The number of data recordings and the per-recording recording volume are thus unlimited up to the capacity of the user-data area 304 of the CD-R disc, and user data Fn and management data FCn can be appended n times where n is the maximum number of recordings as determined by the size of the recorded packets PKT and the capacity of the user-data area 304 of the CD-R disc.

Figure 11:
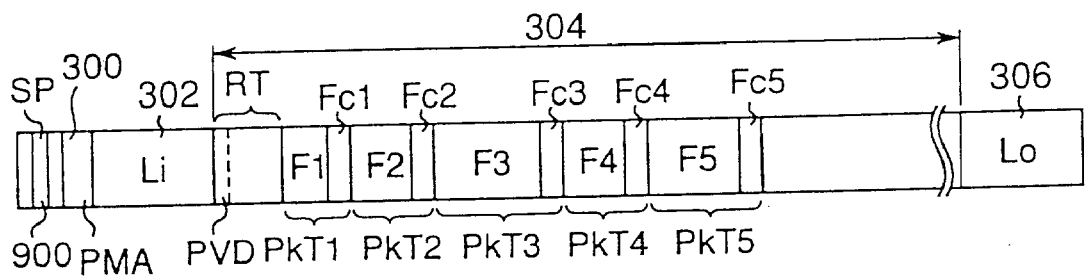
FIG. 11 is a typical illustration of the structure of the recording area when data has been appended four more times to the non-erasable media shown in FIG. 10.

FIG. 11 shows the condition of the recording area after such data appending is repeated four more times, resulting in packets PKT2, PKT3, PKT4, and PKT5 being appended following the packet PKT1 recorded first. Each of these packets also contains a file F2, F3, F4, and F5 and corresponding management data FC2, FC3, FC4, and FC5 in the same manner as packet PKT1. When thus formatted, it is possible to interrupt recording of one session, i.e., before the session is completed, to reference any file from user data F1 to Fn using the management data FC1 to FCn.

Packet PKT2 shows the area appended by the second recording, and comprises file F2 containing the data being recorded and the corresponding file management information FC2. File management information FC2 is generated before recording by detecting the position on the disc to which the data is to be appended, obtaining the file management information FC1 of the packet PKT1 located at the end of the already recorded area, and adding the information for file F2. The file management information FC2 thus contains information for the files F1 and F2 recorded in the already-recorded packet PKT1 and the packet PKT2 to be currently appended. As a result, information about the already-recorded files F1 and F2 can be obtained when the third append is executed by simply reading the second file management information FC2 and it is not necessary to read the file management information FC1 of the already-recorded first packet PKT1.

Because information about the preceding files is indexed at each subsequent append from the file management information FCn of the last packet PKTn, the information for all already-recorded user data files F1 to Fn can be obtained by reading the last file management information FCn. By placing the management information at the end of the already-recorded recording area, the present invention is able to obtain information for the recorded packets. In other words, by recording to the management information data FCn packet location information that is not recorded by the packet writing method defined by the Orange Book, the location of all recorded files Fn can be obtained from the last file management information FCn.

Furthermore, because a large block of file information will be redundantly recorded when the number of recorded files is great, wasting disc capacity can be avoided by storing to file management information FCn only the information for file Fn recorded to packet PKTn and the recording location of the previously recorded file management information FCn-1 for packet PKTn-1.

It is thus possible by means of the present invention to add to and modify as necessary government documents and standards, documents which cannot conventionally be added to or modified once recorded to CD-R disc, a non-erasable medium. Because the results of plural recordings can be stored in a single session, wasted recording capacity can be significantly reduced when compared with multi-session recording. Furthermore, because the file information is recorded at the time of each recording, the recorded content can be referenced by an optical disc recording apparatus based on the present invention even when a session is not formed. However, because the PVD is recorded last when the session is completed in this case, the partially recorded non-erasable medium recorded by the recording apparatus of the invention cannot be read by a conventional CD-ROM drive until the PVD is recorded. A recording and reproducing apparatus according to the present invention capable of freely appending and reproducing this type of non-erasable medium is described further below with reference to FIG. 1, FIG. 2, FIG. 3, FIG. 4, FIG. 5, FIG. 6, FIG. 7, and FIG. 8.

Figure 12:
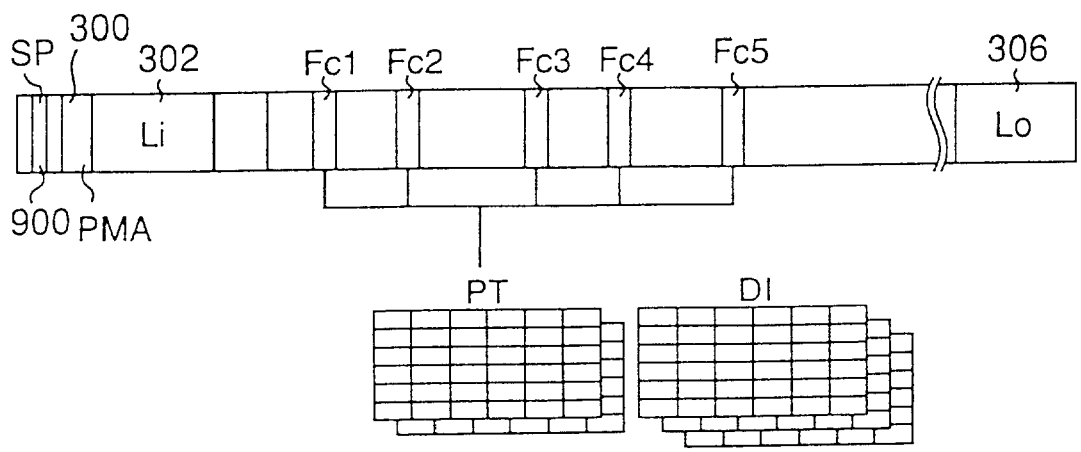
FIG. 12 is used to describe a method for creating a session on the non-erasable media shown in FIG. 11.
Figure 22:
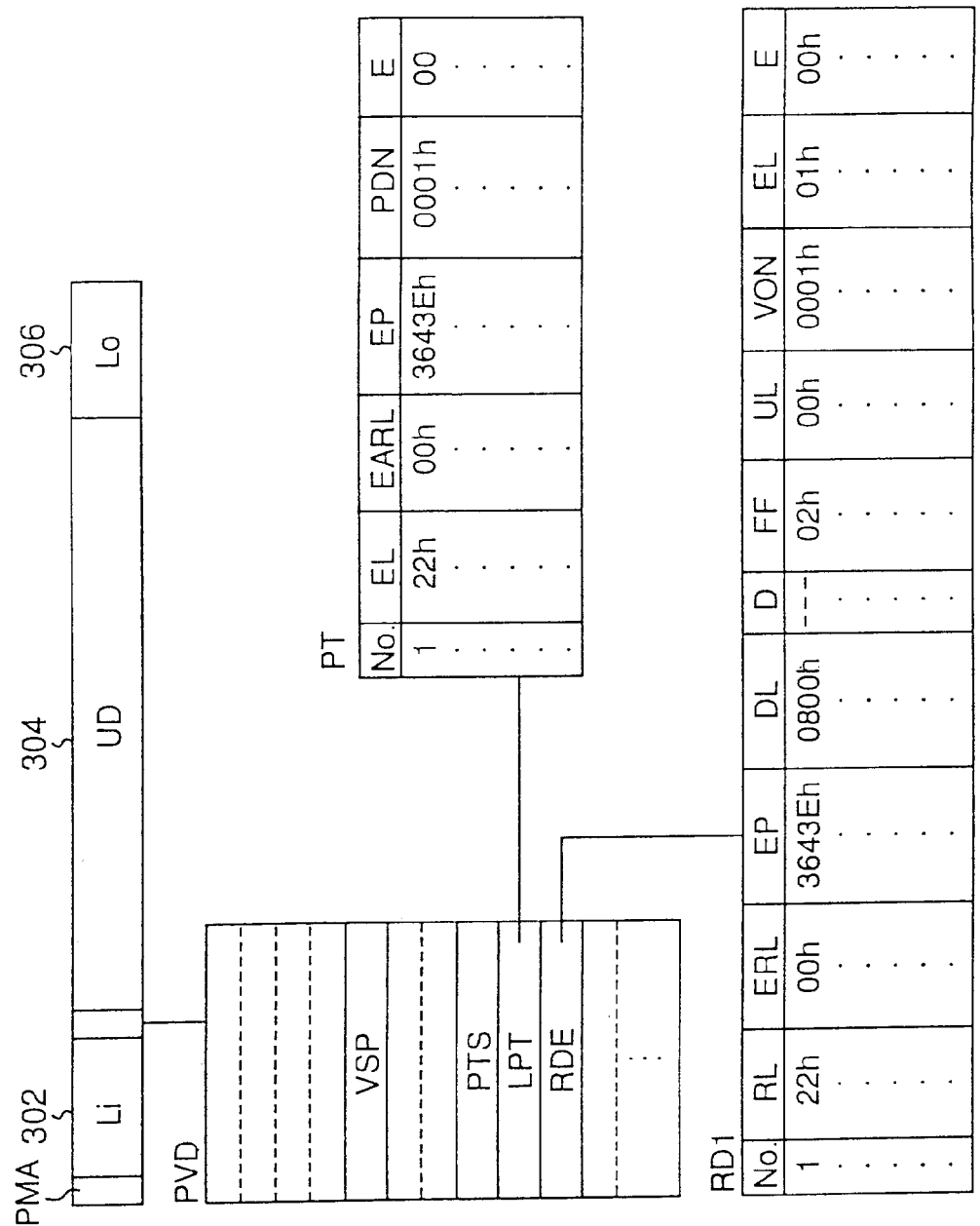
FIG. 22 is a typical illustration of the structure of the PVD in a single session medium.
Figure 23:
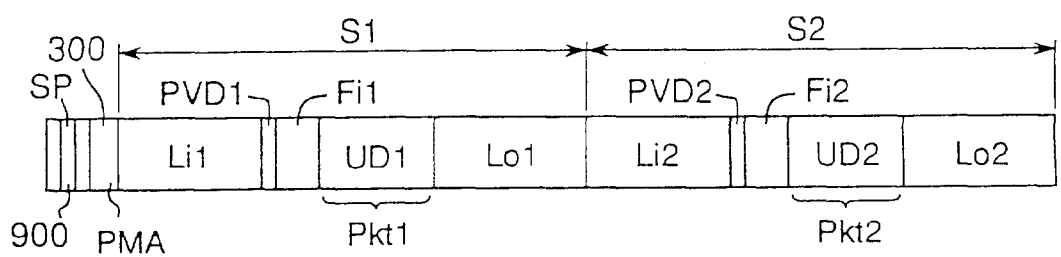
FIG. 23 is a typical illustration of the structure of the recording area with multi-session appending to a CD-R disc, which is a type of non-erasable media, by means of a conventional recording apparatus using a packet writing method.
Figure 24:
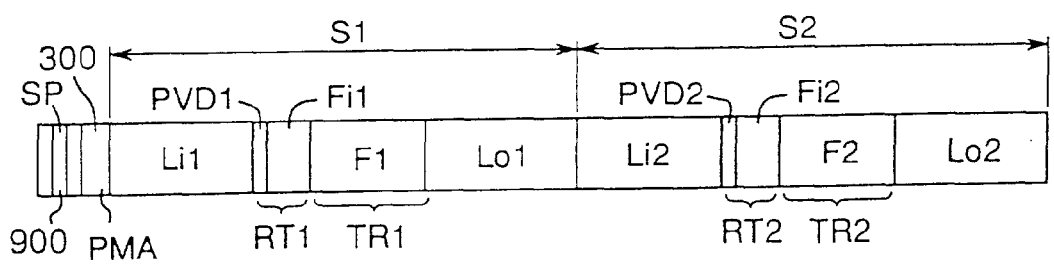
FIG. 24 is a typical illustration of the structure of the recording area with multi-session appending to a CD-R disc, which is a type of non-erasable media, by means of a conventional recording apparatus using a track-at-once method.

A method of creating a session from the recording state shown in FIG. 11 is shown in FIG. 12. More specifically, when data is not appended a fifth time and the recording process is to be completed, the directory information DI and information about the content of user data files F1, F2, F3, F4, and F5 is obtained from the corresponding management data FC1, FC2, FC3, FC4, and FC5, and the format information Fi is generated comprising the Path Table PT and all directory information DI based on the ISO-9660 standard as described with reference to FIG. 22. It is also determined whether the generated format information Fi can be recorded to the reserved track RT, i.e., whether the size of the format information Fi is less than the available capacity of the reserved track RT minus the PVD, to determine the address to which the format information Fi is recorded. The address of, for example, the Path Table PT is calculated from the determined address, and the PVD storing that value is created. Because the PVD contains the recording address of the format information Fi and the recording address of the format information Fi can therefore be correctly obtained by reading the PVD, the format information Fi can be recorded to any desired position in the user data recording area.

Figure 13:
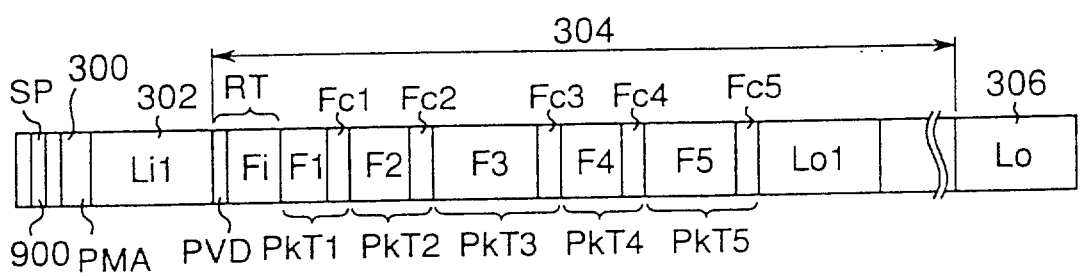
FIG. 13 is a typical illustration of the structure of the recording area when format information Fi is recorded with the PDV in the reserved track.

FIG. 13 shows the case in which the format information Fi is sufficiently smaller than the available capacity of the reserved track RT, i.e., is recorded following the PVD in the reserved track RT. Note that the lead-in information Li is recorded to the lead-in area at the inside circumference side of the reserved track RT, and the lead-out information Lo is recorded on the outside circumference side following the last packet PKT5 in the user data area. As a result, when the format information Fi can be stored to the reserved track RT, the reserved track RT area can be effectively used and the format information, which is relatively important, can be stored as close to the inside circumference as possible, which is preferable because of the CD-R disc characteristics resulting in greater speed and stability closer to the inside circumference of the disc.

When reserving a track it is therefore also effective to estimate the total number of files that will be recorded to appropriately increase or decrease the reserved track length.

Figure 14:
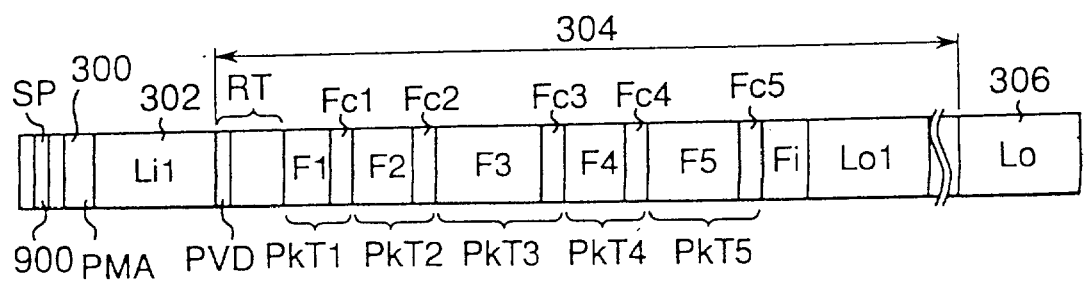
FIG. 14 is a typical illustration of the structure of the recording area when format information Fi is recorded from the end of the user data.

FIG. 14 shows the case in which the format information Fi is larger than the available capacity of the reserved track RT, and is therefore recorded following the last user data packet PKT5. Note that the lead-in information Li is recorded to the lead-in area on the inside circumference side of the reserved track RT, and the lead-out information Lo is recorded following on the outside circumference side of the format information Fi recorded after the last packet PKT5 in the user data area.

It is therefore possible by means of the above procedure to form a single session from a file set or data recorded during plural operations. Note that the CD-R discs shown in FIG. 13 and FIG. 14 meet the Yellow Book and ISO-9660 standards, and can be reproduced by any CD-ROM drive.

The non-erasable media recording method of the present invention for writing to a non-erasable medium based on the packet writing method defined in the Orange Book has been described above.

Recording any particular number of times during one session using the track-at-once method also defined in the Orange Book is described next referring to FIG. 15, FIG. 16, FIG. 17, and FIG. 18.

The track-at-once method is a method for recording by track units, and the number of recordings is therefore limited to the maximum number of tracks, i.e., 99. This means that it is not possible to record any more once 99 tracks are recorded even if the tracks are very small and most of the available user data area of the disc is therefore not actually used. While the disc utilization efficiency of the track-at-once method is thus not as good as that of the packet writing method, the track-at-once method operates using track units, which are easier to manage, and can therefore be easily implemented.

The first step in the track-at-once method is also to reserve a track as shown for recording the PVD storing the data table address in the logical format of the data to be recorded. As with the packet writing method described with reference to FIG. 9, the PVD length is a fixed length shorter than the shortest track defined by the Red Book, and it is sufficient to reserve a track of the length satisfying the Red Book standard.

Figure 15:
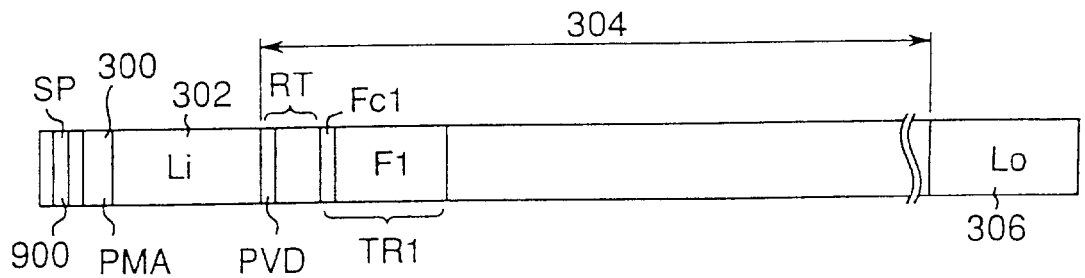
FIG. 15 is a typical illustration of the structure of the recording area in a track-at-once method when data has been appended once to non-erasable media in which a track has been reserved based on the non-erasable media recording method according to the present invention.

FIG. 15 shows the condition of the recording area when the user data file F1 has been appended as the first recording to the CD-R disc on which a track has been reserved. The area appended by the first recording is shown in FIG. 15 as area TR1 containing the recorded data file F1 and the corresponding file management data FC1 relating to file F1. Note that the file management data FC is the same as that recorded in the packet writing method described above. However, because the packet writing method reads from the end, the size or start address of the management data FC is recorded either to the end or at a fixed position in the management data FC. The track-at-once method, on the other hand, reads from the beginning, and it is therefore not necessary to record the size or start address of the management data FC.

Figure 16:
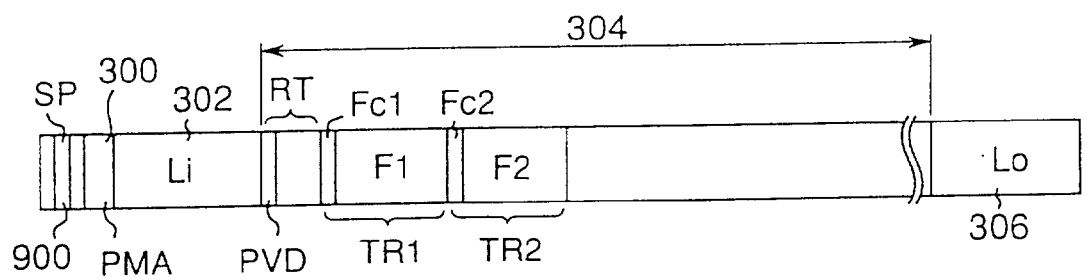
FIG. 16 is a typical illustration of the structure of the recording area when data has been appended a second time to the non-erasable media shown in FIG. 15.

FIG. 16 shows the condition after recording file F2 to the disc shown in FIG. 15. In FIG. 16 area TR2 is the area appended by the second recording, and contains the recorded data file F2 and the corresponding file management data FC2. The file information FC2 is generated before recording by detecting the recording start position of track TR1 to obtain the file information FC1 recorded at the beginning of the track, and then adding the information for file F2. The file information FC2 thus contains information for all files F1 and F2, enabling the information for the recorded files to be obtained at the next recording without reading file management information FC1.

Note that the number of files recorded at one time is one in the present embodiment, and a large amount of file information will be redundantly recorded when many files are recorded. It is possible to avoid wasting disc capacity, however, by recording only the information for file F2 recorded to TR2 to file management information FC2. The starting position of each track is recorded to the reserved PMA area of the disc in the track-at-once method conforming to the Orange Book, and the starting positions can be obtained after recording. The file information FC is therefore placed at the beginning of the track. It should be noted that the number of data recordings is limited to the maximum number of tracks, which is 99, and the size of each recording is therefore the shortest length of each track, i.e., 4 seconds (=600 KB) due to this limitation.

Figure 17:
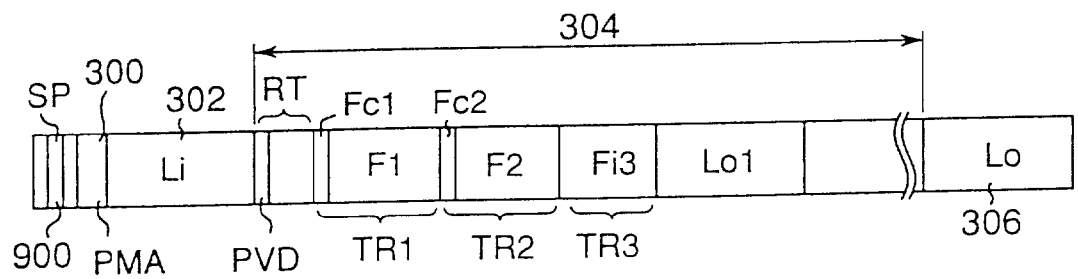
FIG. 17 is used to describe a method for creating a session on the non-erasable media shown in FIG. 16.

FIG. 17 shows the condition when a session is completed on the disc after twice appending to the disc shown in FIG. 16. Both the lead-in area 302 and lead-out area 306 are areas defined by the Red Book for recording the TOC, and a session that can be reproduced on any CD-ROM drive is completed by recording both the lead-in area 302 and lead-out area 306. The PVD is recorded to the reserved track RT, and the format information Fi3, which is generated based on the ISO-9660 standard using the information for files F1 and F2 obtained from the file management information FC2-, is recorded as a new track TR3 following track TR2. However, when a session is formed at the same time file F2 is recorded, the format information Fi can be recorded as part of track TR2.

Because the PVD contains the recording location of the format information Fi, the format information Fi3 can be recorded at any desired location in the user data area if the address thereof can be accurately determined from the PVD. Therefore, when the format information Fi exceeds the available capacity of the reserved track RT as in the present example, the format information Fi can be recorded immediately after the file F2. Then, the lead-in area Li is the lead-out area Lo is recorded following the format information Fi. In the present example the lead-in area Li is formed in the reserved lead-in area 302, and the lead-out area Lo is formed not in the lead-out area 306 but in the user-data area 304.

Figure 18:
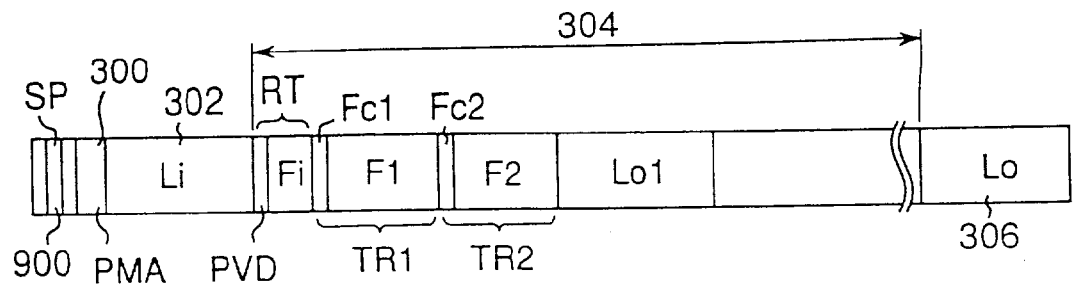
FIG. 18 is a typical illustration of the structure of the recording area when a session has been formed on the non-erasable media shown in FIG. 16.
Figure 19:
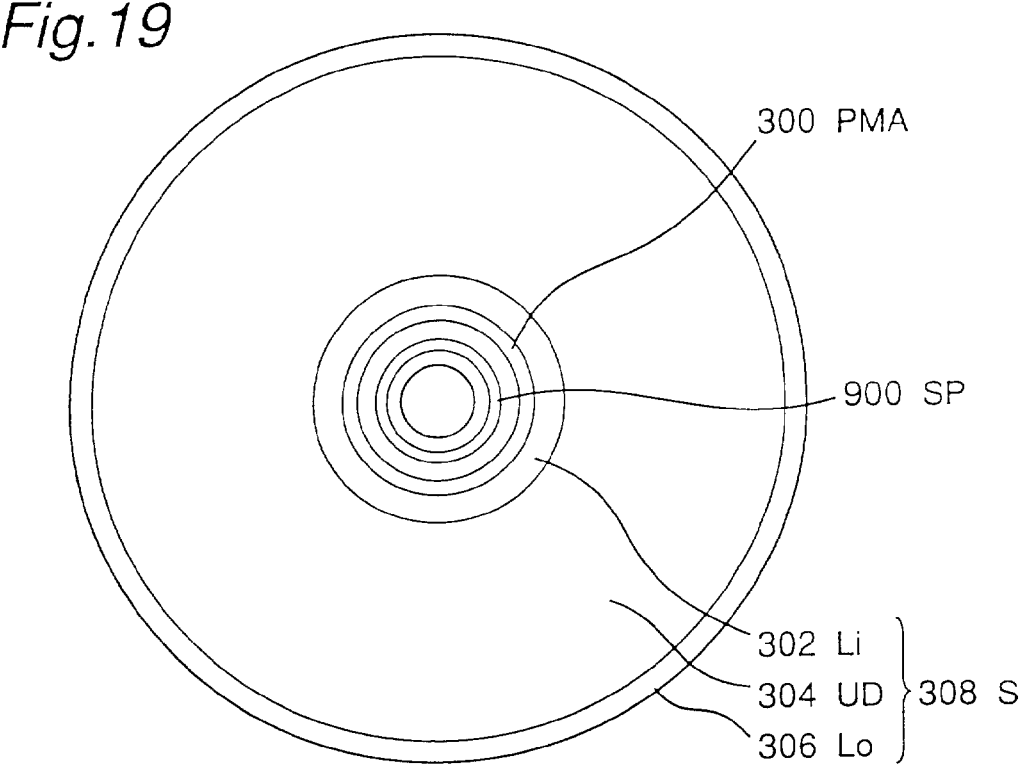
FIG. 19 is a typical plan view of the recording area of non-erasable media before recording.

FIG. 18 shows the condition when a session is formed on the twice appended disc shown in FIG. 16 similarly to the packet writing example shown in FIG. 17. In this example, however, the format information Fi is smaller than the available capacity of the reserved track RT, and is therefore recorded following the PDV in the reserved track RT. As described above the PVD stores the recording location of the format information Fi. In other words, because a track cannot be segmented and recorded with the track-at-once method, the reserved track must be recorded to the end of the track even if there is excess capacity in the reserved track RT when the reserved track is recorded. This is based on the Orange Book requirement that tracks in a session must be completely recorded before completing the session. When implementing the present invention with a non-erasable medium for which this physical format requirement does not apply, however, it is not necessary to record the available capacity of the reserved track.

In addition to being able to use the area of the reserved track more effectively than the appending method shown in FIG. 17, the format information, which is relatively important, can be stored as close to the inside circumference as possible, which is preferable because of the CD-R disc properties resulting in greater speed and stability closer to the inside circumference of the disc.

When reserving plural tracks it is therefore also effective to estimate the total number of files that will be recorded to appropriately increase or decrease the reserved size.

It is therefore possible by means of the above procedure to form a single session from files recorded separately during plural operations. Note that the discs shown in FIG. 17 and FIG. 18 meet the Yellow Book and ISO-9660 standards, and can be reproduced by any CD-ROM drive. Furthermore, because the file information is recorded simultaneously at each recording, it is possible to access the recorded content using a non-erasable media recording and reproducing apparatus according to the present invention even when a session is not formed.

A preferred embodiment of a non-erasable media recording apparatus when the present invention is used for recording to a CD-R disc, an optical non-erasable recording medium, is described next with reference to FIG. 1.

The recording apparatus RC according to the present invention comprises a recording and reproduction unit 511, decoder 513, encoder 515, track controller 517, file controller 519, and controller 500 for controlling the overall operation of the recording apparatus RC. It should be noted that the mechanical construction of the non-erasable medium recording apparatus RC resembles that of a conventional CD-R disc recording apparatus, and primarily the differences are described below.

The recording and reproduction unit 511 is controlled by the controller 500 and contains all of the means for optically recording and reproducing information by emitting a laser beam according to a particular method to a particular spot on the CD-R disc based on an address signal and drive signal generated by the recording apparatus RC. Because the recording and reproduction unit used on conventional CD-R discs can be used, a detailed description of the structure thereof is omitted below.

Controlled by the controller 500, the recording and reproduction unit 511 reads the PMA information from the PMA area of the CD-R disc to generate the PMA reproduction signal So501; reads the track information of the session from the lead-in area Li to generate the first track information reproduction signal So503; reads the reserved track information from the reserved track RT to generate the reserved track information reproduction signal So504; reads the information of the corresponding user data file from the user data area F to generate the user data information reproduction signal So505; reads the management data from the user data management data FC to generate the user data management information reproduction signal So507; reads the track information for the session from the lead-out area Lo to generate the second track information reproduction signal So509; and supplies the generated signals to the decoder 513.

Note that the reserved track information contains primarily the PVD and, in some cases, the format information Fi.

The decoder 513 then decodes the supplied signals So501, So503, So504, So505, So506, So507, and So509 to respectively generate the decoded PMA reproduction signal Sd501, first track information reproduction signal Sd503, reserved track information reproduction signal Sd504, user data information reproduction signal Sd505, user data management information reproduction signal Sd507, and second track information reproduction signal Sd509.

The track controller 517 is connected to the decoder 513 to receive therefrom the PMA reproduction signal Sd50, the first track information reproduction signal So 503, and the second track information reproduction signal Sd509.

The track controller 517 comprises a first memory 521 for storing the information from the PMA reproduction signal Sd501, and a second memory 523 for storing the information from the track information reproduction signals So503 and So509. When the track controller 517 receives a "create session command," it determines the track information to be contained in the TOC for the data to be recorded based on the stored information, and outputs the PMA information through the first memory 521 as PMA recording signal Si501 to the encoder 515, and holds the track information in or passes the track information through the second memory 523 to the encoder 515 as first track information recording signal Si503 and second track information recording signal Si509.

The file controller 519 is also connected to the decoder 513 and receives the reserved track information reproduction signal Sd504, the user data management information reproduction signal So507; and the user data information reproduction signal Sd505. The file controller 519 comprises a third memory 525 for storing the information from the reserved track information reproduction signal So504 and the user data management information reproduction signal Sd507, and a fourth memory 527 for storing the information from the user data information reproduction signal Sd505. Based on the stored information the file controller 519 determines the PVD information and the user data written to the CD-R disc.

When a "create session command" is received, the file controller 519 outputs to the encoder 515 the reproduced reserved track information stored in the memory 525 thus determined as the reserved track information recording signal Si504 to be written to the reserved track RT. When a "record recording block request" is received, the file controller 519 outputs the user data management information reproduction signal to the encoder 515 as the user data management information recording signal Si507 to be written to the user data management data area FC.

The encoder 515 encodes the recording signals Si501, Si503, Si509, Si504, Si507, and Si505 in conformance with the Red Book and Orange Book to generate and supply to the recording and reproduction unit 511 the encoded PMA recording signal Se501, first track information recording signal Se503, second track information recording signal Se509, reserved track information Se504, user data management information reproduction signal Se507, and user data reproduction information recording signal Se505.

The recording and reproduction unit 511 is also controlled by the controller 500 and records the signals Se501, Se503, Se509, Se504, Se507, and Se505 to the specified location on the CD-R disc.

The track controller 517 and file controller 519 are preferably achieved in software.

The operation of the present non-erasable media recording apparatus is described in detail below with reference to the flow charts in FIG. 2, FIG. 3, FIG. 4, FIG. 5, and FIG. 6.

The method of recording to non-erasable media according to the present invention is described with reference to FIG. 2 below for the case in which the recording medium is a CD-R disc. It should be noted that because the basic structure and operation of the apparatus for recording and reproducing non-erasable CD-R media according to the present invention is substantially identical to the structure and operation of a conventional apparatus, the following explanation focuses primarily on the differences in operation. The packet writing recording method is also used by way of example in the following explanation because the basic recording operations of the packet writing and track-at-once methods are fundamentally the same.

The recording operation of the present recording apparatus RC starts when a user instructs the start of a recording operation to the non-erasable medium.

Once the recording operation starts, the recording status of the CD-R disc to be recorded is recognized in the Recognize Disc Status subroutine of step #100. The procedure then advances to step #200. The details of this subroutine are described below with reference to FIG. 3.

Data is then recorded to the CD-R disc in single recording block units by the Record Data subroutine in step #200. The procedure then advances to step #300. The details of this subroutine are described below with reference to FIG. 5.

It should be noted that a "recording block" is herein defined as described above as the area recorded by one recording operation, i.e., the area recorded from the start to the finish of a recording operation by the recording apparatus to non-erasable media based on a user instruction. In other words, a recording block is the collection of data comprising one management information block and the file set managed by means of that management information.

One packet normally corresponds to one recording block in the packet writing method, and one track normally corresponds to one recording block in the track-at-once method. However, when segmented into plural packets or tracks and the management information correctly catalogs said plural packets or tracks, plural packets or tracks can constitute one recording block. It is thus possible for one recording block to comprise any number of blocks depending upon the content of the management information.

The controller 500 then determines whether to continue recording at step #300. This determination can be made by a user entering a response using a keyboard or other input means, or by first informing the recording apparatus of the amount of data to be recorded so that the recording apparatus determines whether the specified data amount has been recorded. In either case, if a YES is returned the procedure advances to step #302.

At step #302 it is determined whether there is sufficient available capacity in the user-data area 306 of the CD-R disc to record one or more recording blocks, i.e., whether appending is possible or not. It should be noted that "one or more recording blocks" is equivalent to 300 sectors or more (600 KB) with track-at-once recording, and 8 sectors or more with packet writing. Even more specifically, the total number of tracks (maximum 99) is also checked with track-at-once recording, and, considering the possibility of one track being consumed by the logical format information when a session is created, it is determined that appending is possible if the number of existing tracks is 98 or less. In other words, the track controller 517 checks available capacity in track units while referencing the first memory 521 and second memory 523, and the file controller 519 checks available capacity in sector units.

The overall evaluation of appendability is made by the controller 500 based on the check results returned by the track controller 517 and file controller 519.

If the evaluation result is YES, i.e., there is sufficient available capacity to record one recording block or more, the procedure loops back to the Recognize Disc Status subroutine in step #100 and the next data recording operation is executed.

It should be noted that while the disc status is recognized in step #100 at each recording by recording block unit in this example, it is also possible to store the disc status first determined at the beginning of the procedure in memory and update the stored disc status at each recording. In this case it is possible to loop from step #302 directly to the Record Data subroutine in step #200.

However, if NO is returned at step #302, i.e., there is not sufficient capacity available to record at least one recording block, the procedure terminates.

However, if NO is returned at step #300 or step #302, in other words, if no further data is to be recorded or can be recorded, the procedure advances to step #304.

It is then determined whether to complete a session or not at step #304. If the result is NO, i.e., if the session is to not be completed so that the CD-R disc remains in a data appendable states the procedure advances to step #306.

At step #306 the controller 500 then generates disc status signal DS14 and terminates the recording process. The disc status signal DS14 declares that the disc is a normal appendable disc containing a reserved track RT and reproducible appended data other than the disc session.

Figure 2:
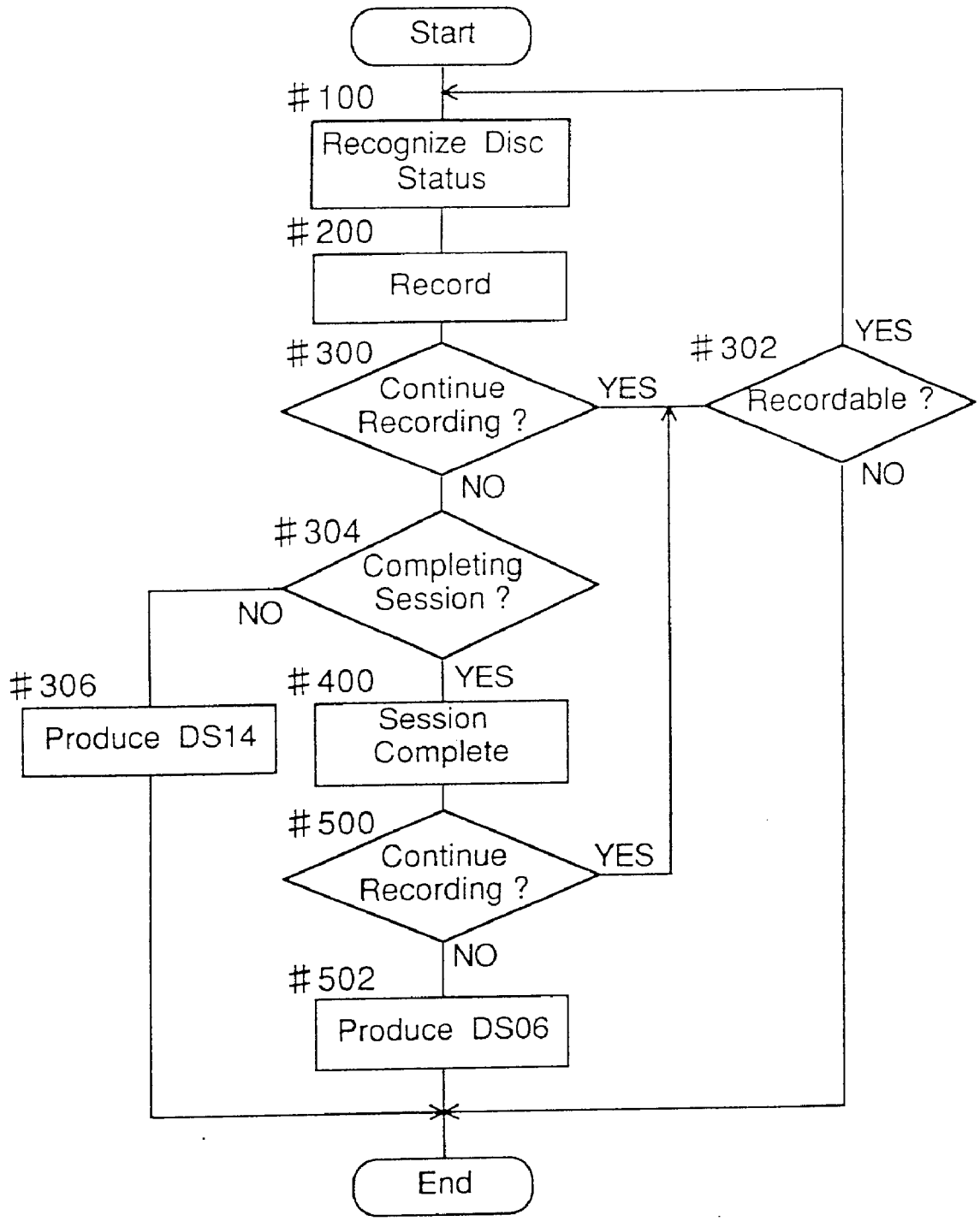
FIG. 2 is a flow chart of the major operation of the non-erasable media recording apparatus shown in FIG. 1.

On the other hand, if a YES is returned at step #304, meaning that no further data is to be appended to the CD-R disc and the CD-R disc is to be completed as a CD-ROM conforming to the ISO-9660 standard, the procedure advances to step #400 (FIG. 2).

It should be further noted that once a session is finished on the CD-R disc, data can be freely read by any existing CD-ROM drive as was previously described.

After a session is created by the Complete Session subroutine of step #400 on the non-erasable media to which data has been recorded by the loop comprising step #100, #200, #300, and #302, the procedure advances to step #500. The details of this subroutine are described below with reference to FIG. 6.

The controller 500 then determines whether to continue recording at step #500 in the same manner as in step #300. Unlike in step #300, however, the controller 500 determines in this step whether to record data for a new session to a CD-R disc for which recording to create a CD-ROM compatible disc has already been completed. If step #500 returns YES, the procedure loops back to step #302 to determine if sufficient available capacity remains for data recording. Operation subsequent to step #302 is as described above.

However, if step #500 returns NO, i.e., no further data is to be recorded, the procedure advances to step #502.

The recording process is then terminated in step #502 by the controller 500 generating disc status signal DS06, which declares that the disc is reproducible, recordable, and does not have a reserved track RT.

Figure 3:
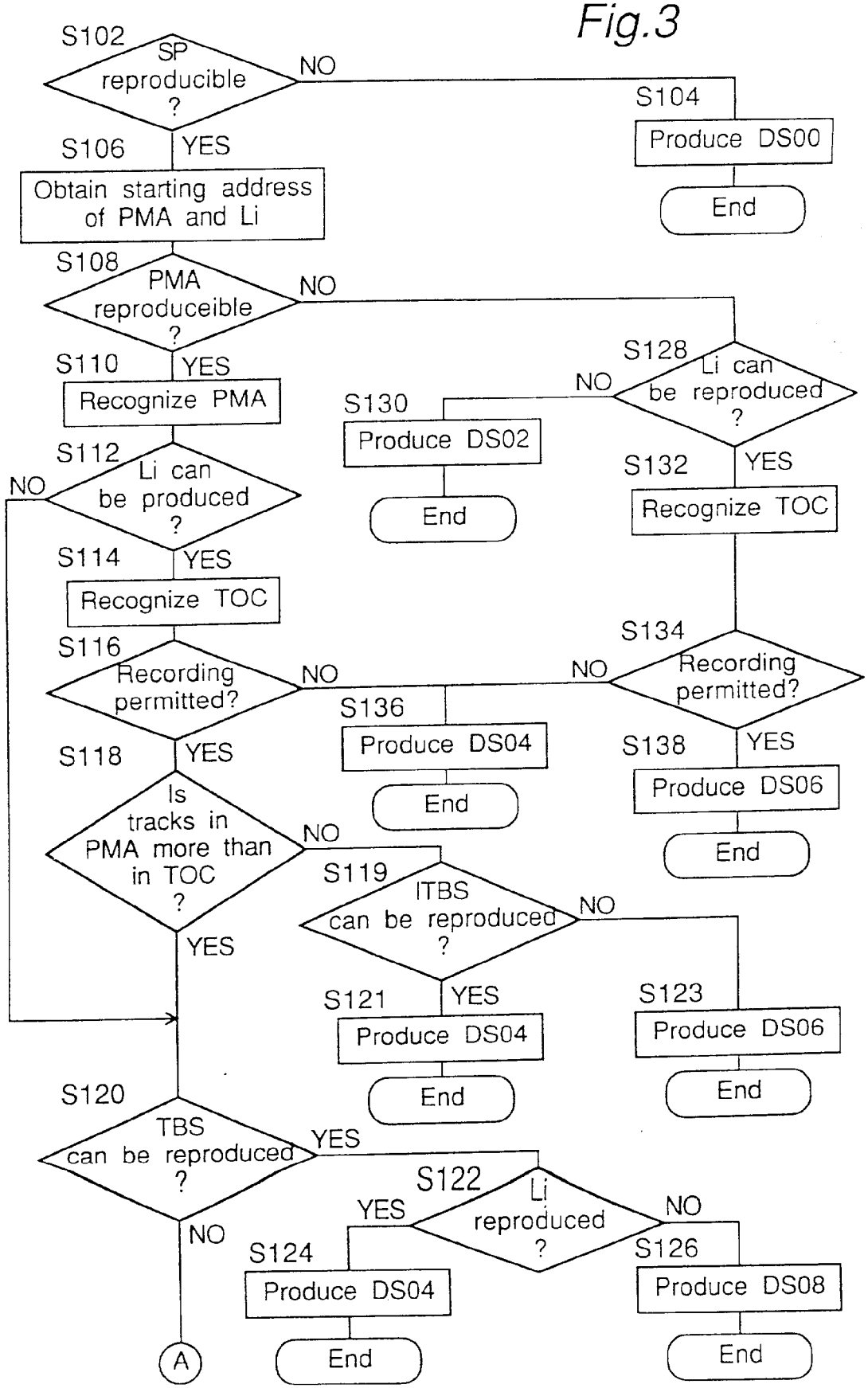
FIG. 3 is a flow chart of the details of the first part of the disc status recognition subroutine in the flow chart shown in FIG. 2.
Figure 4:
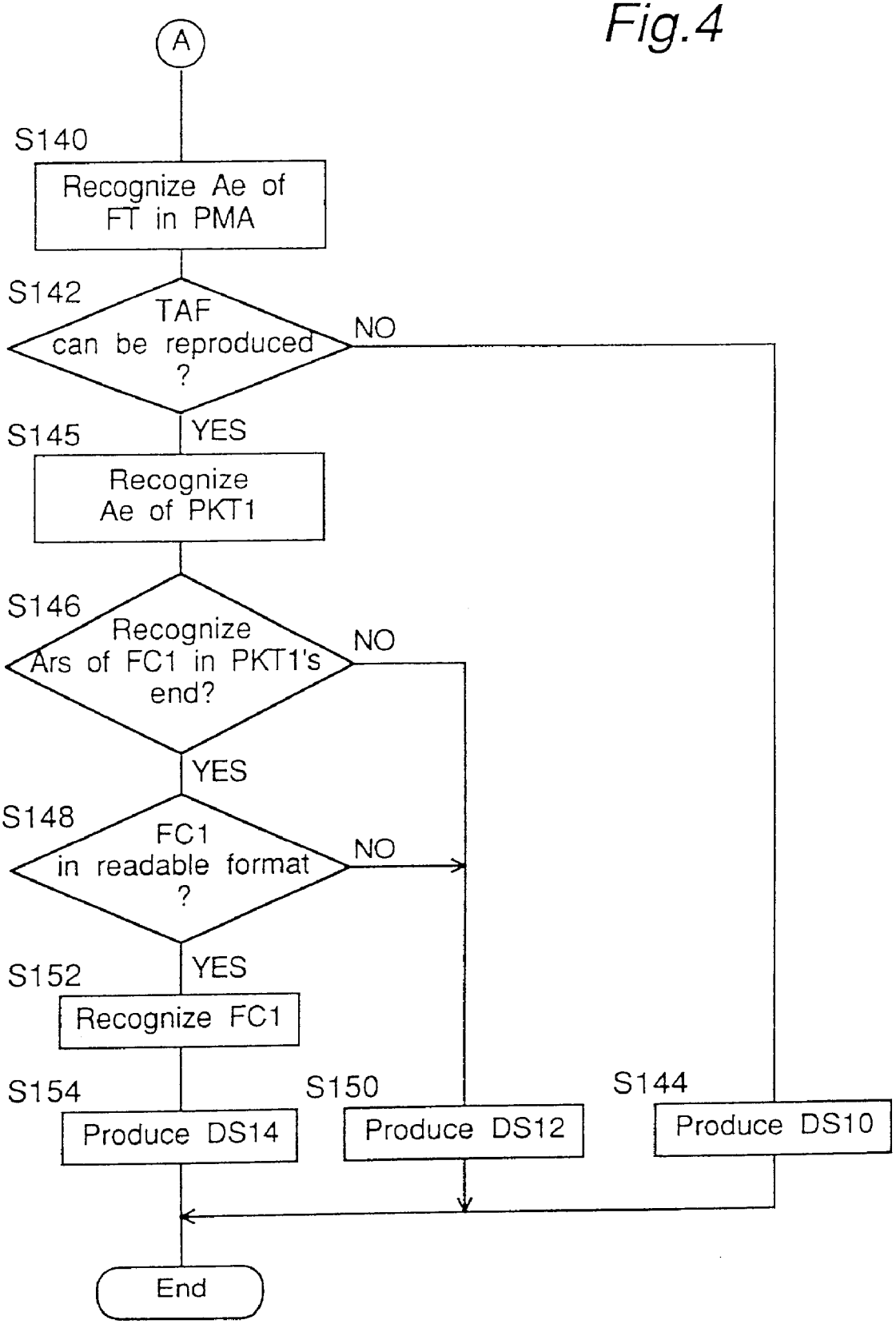
FIG. 4 is a flow chart of the details of the second part of the disc status recognition subroutine in the flow chart shown in FIG. 2.

The Recognize Disc Status subroutine of step #100 in FIG. 2 is described below with reference to FIG. 3.

At step S102 it is determined whether the special information SP area 900 provided on the inside circumference side of the PMA in a CD-R disc can be accessed and the special information SP can be read as defined by the orange Book. If the special information SP cannot be read and a NO is returned, i.e., data cannot be recorded to this disc, the procedure moves to step S104.

In other words, the recording and reproduction unit 511 accesses the special information SP area 900. The content reproduced by the recording and reproduction unit 511 is then decoded by the decoder 513 and input to the track controller 517 where the recorded content is analyzed. If any of these reproduction, decoding, or analysis steps is not completed normally, the controller 500 determines that accessing the special information SP failed and therefore passes control to S104.

At step S104 disc status signal DS00 declaring that the disc being accessed cannot be recorded, i.e., that the disc is not a CD-R disc, is generated and the process ends.

If step S102 returns YES, the procedure moves to step S106.

At step S106 the starting addresses of the PMA and lead-in area Li are obtained from the special information SP area 900, and the procedure moves to step S108. In other words, the special information generated by the recording and reproduction unit 511 and decoded by the decoder 513 is analyzed by the track controller 517, and the information required thereafter for the recording and reproducing process is stored to memory 521.

At step S108 the PMA is accessed based on the PMA starting address obtained in step S106 to determine whether the PMA information can be read. If the PMA information is reproducible, step S108 returns YES and the procedure moves to step S110.

In other words, the recording and reproduction unit 511 reproduces, the decoder 513 decodes, and the track controller 517 analyzes the PMA from the PMA address location recorded to the special information. Only when all of these processes is executed normally is it determined that the PMA can be correctly reproduced and the procedure moves to step S110.

At step S110 the PMA information is recognized from the PMA and the procedure moves to step S112. In other words, the recording and reproduction unit 511 reproduces, the decoder 513 decodes, and the track controller 517 analyzes the PMA. The result is then stored to memory 521.

At step S112 the lead-in area Li is accessed based on the lead-in area starting address obtained in step S106, and data reproducibility is determined. If the data is not reproducible, a NO is returned and the procedure moves to step S120. The process executed by step S120 is described below.

If the data is reproducible, however, YES is returned and the procedure moves to step S114. In other words, the recording and reproduction unit 511 reproduces the signal recorded to the disc from the starting address of the lead-in area obtained in step S106, and the reproduced signal is decoded by the decoder 513. The track controller 517 then checks whether the decoded signal is formatted appropriately for the TOC.

After the TOC information is obtained from the lead-in area Li at step S114, the procedure moves to step S116. In other words, the recording and reproduction unit 511 reproduces, the decoder 513 decodes, and the track controller 517 analyzes the lead-in area information. The result is then stored to memory 523 as the TOC.

At step S116 it is determined whether appending is permissible based on the TOC information obtained in step S114. If not permissible, the procedure moves to step S136. In other words, the track controller 517 checks the content of the TOC information stored to memory 523 according to the Orange Book standard to determine whether appending is permissible.

The disc status signal DS04 declaring that the disc is reproducible but not recordable is generated at step S136, and the process then ends.

If recording is permissible, step S116 returns YES and the procedure moves to step S118. In other words, the track controller 517 determines that recording is not permitted based on the results of analyzing the TOC. And based on this determination the controller 500 generates the disc status signal DS04.

At step S118 it is determined whether the number of tracks indicated in the PMA information obtained in step S110 is greater than the number of tracks indicated by the TOC information obtained in step S114. If the result is YES and there are tracks not included in a session, the procedure moves to step S120. In other words, the track controller 517 compares the PMA track information stored to memory 521 with the TOC track information stored to memory 523 to determine whether the number of PMA tracks is greater.

However, if step S118 returns NO because there are no tracks recorded outside a session, the procedure moves to step S119.

At step S119 it is determined whether the position to which the beginning of the track (shown as ITBS in FIG. 3) should be recorded outside a session is reproducible. If YES there is an already-recorded area which does not start with the reserved track outside the session, and the procedure moves to step S121. If NO, the procedure moves to step S123.

In other words, the track controller 517 calculates the location to which the first track outside a session should be recorded. The recording and reproduction unit 511 reproduces and the decoder 513 decodes the signal recorded to disc from the calculated position. If both reproduction and decoding are accomplished normally, it is determined that recording is in progress.

At step S121 the disc status signal DS04, which declares that the disc contains a reproducible session but appending (recording) according to the present invention is not possible, is produced and the process ends. In other words, the track controller 517 determines that the disc contains a session and that the beginning of the track area outside the session has already been recorded. Based on this determination by the track controller 517, the controller 500 outputs DS04.

The disc status signal DS06, which declares that the disc contains only a reproducible session, does not have a reserved track RT, and the disc area outside the session has not been recorded, is output at step S123, and the process then ends.

In other words, the track controller 517 determines that the disc contains a session and the disc area outside the session is unrecorded. Based on this determination by the track controller 517, the controller 500 outputs DS06.

At step S120, i.e., only if step S112 returns NO or step S118 returns YES, the address of the first track (shown as TBS in FIG. 3) formed outside the session and specified by the PMA obtained in step S110 is accessed to determine whether data can be reproduced from that track. If data cannot be reproduced from the first track outside the session, i.e., if that first track is the reserved track, YES is returned and the procedure moves to step S122. In other words, the track controller 517 obtains the information about the first track outside the session from the memory 521, the recording and reproduction unit 511 reproduces from the starting address of that track, and the decoder 513 decodes the reproduced signal. The accessed track is determined to be the reserved track if reproduction and decoding are not executed normally.

At step S122 it is determined whether the previous step S112 returned YES, i.e., whether data could be reproduced from the lead-in area Li. Step S122 returns YES if the processes of steps S112, S114, S116, S118, and S120 have been executed. More specifically it is determined that the disc is reproducible because there is a session, and the procedure moves to step S124. Based on the result of step S112, the track controller 517 determines whether a session is present.

The controller 500 produces the disc status signal DS04 declaring that the disc is recordable in step S124, and the process then ends.

If control skips from step S112 to step S120, however, step S120 returns NO. More specifically, it is determined that no session has been recorded because the TOC cannot be read, and normal disc reproduction is therefore not possible, or it is determined that append recording by means of the invention is not possible because there is no reserved track RT. The procedure therefore advances to step #142.

At step S126 the controller 500 produces the disc status signal DS08 declaring the disc is neither recordable nor reproducible.

On the other hand, if step S108 returns NO because the PMA information cannot be read, the procedure moves to step S128.

As in step S112, it is determined whether data can be reproduced from the lead-in area Li at step S128. If data cannot be reproduced, meaning that the target disc is a blank disc to which nothing has yet been recorded, a NO is returned and the procedure moves to step S130.

At step S130 the controller 500 produces the unrecorded disc status signal DS02 declaring that the disc is an unrecorded disc, and the process then ends. However, if step S128 returns YES, the procedure moves to step S132.

At step S132 the TOC information is obtained as in step S114, and the procedure moves to step S134.

At step S134 it is determined whether appending is permissible based on the TOC information as in step S116. If not permissible, the procedure moves to step S136 and the disc status signal DS04 declaring that the disc is reproducible but not recordable is produced. However, if recording is permitted, the procedure moves to step S138, the disc status signal DS06 is produced, and the process terminates.

The disc status signal DS04 declaring that the disc is reproducible but not recordable is generated at step S136, and the process then ends.

At step S138 the controller 500 produces the disc status signal DS06 declaring that the disc contains only a session, and the process then ends.

If a reserved track is not formed and step S120 therefore returns NO, the procedure moves to step S140.

At step S140 the end point of the last recorded track (Ae in FIG. 4) is obtained from the last track information recorded to the PMA based on the PMA information obtained in step S110. More specifically, the track controller 517 extracts the last track information from the PMA information stored in memory 521, and obtains the end location of that track.

At step S142 the disc is accessed from the address obtained in step S140 to determine whether the track following that address (TAF in FIG. 4) is reproducible. If the next track is not reproducible, i.e., the first data block PKT1 is not recorded, NO is returned and the procedure moves to step S144. The recording and reproduction unit 511 then reproduces and the decoder 513 decodes the signal recorded to the disc from the track end point obtained in step S140. If either reproduction or decoding is not executed normally, the track controller 517 determines that there is no packet recorded after the reserved track RT.

At step S144 a reserved track only disc status signal DS10, which declares that a reserved track RT is recorded to the disc but nothing has been recorded thereafter, is produced and the process ends.

However, if step S142 returns YES because file F2 of the first appended packet PKT2 has been recorded, the procedure moves to step S146.

At step S145 the disc is accessed from the end point of the last track obtained in step S140, the last address in the first packet PKT1 recorded as shown in FIG. 10 is obtained, and the procedure moves to step S146. In other words, the recording and reproduction unit 511 continuously reproduces the disc from the end point of the last track obtained in step S140, and the decoder 513 decodes the reproduced signal. The track controller 517 determines that the sector before the position from which normal reproduction or decoding is not possible is an already-recorded area, i.e., is the end of the packet PKT1.

At step S146 it is determined whether the address at which recording the management data FC1 of packet PKT1 starts is recorded at the end of the first append packet PKT1 detected in step S145. If the starting address of the management data FC1 is not recorded, i.e., if the information about file F1 of the first append packet PKT1 recorded outside a session is not reproducible but recording is possible, NO is returned and the procedure moves to step S150. The file controller 519 determines whether the address of the management data FC1 is recorded to the last sector of the packet PKT1 reproduced by the recording and reproduction unit 511 and decoded by the decoder 513.

At step S150 the disc status signal DS12, which declares that the disc is not reproducible but is recordable outside the session, is produced and the process ends.

However, if YES is returned by step S146, the procedure moves to step S148.

At step S148 the management data FC1 is reproduced from the address of the management data FC1 obtained in step S146 to determine whether the management data FC1 is recorded in a readable format. If NO is returned the procedure moves to step S150 similarly to the NO result of step S146, the disc status signal DS12 is produced, and the process ends. In other words, the recording and reproduction unit 511 reproduces the signal recorded to the disc at the location of the management data FC1, and the decoder 513 decodes the reproduced signal. The file controller 519 evaluates the decoded signal to determine whether the signal is recorded in a format appropriate for the management information.

However, if step S148 returns YES, the procedure moves to step S152.

The information relating to file F1 is then obtained from the management data FC1 at step S152, and the procedure moves to step S154. In other words, the file controller 519 analyzes the content of the management data FC1 reproduced by the recording and reproduction unit 511 and decoded by the decoder 513, and stores the result as information related to file F1 to memory 525.

At step S154 the disc status signal DS14 declaring that the disc is appendable is produced and the process ends.

Figure 5:
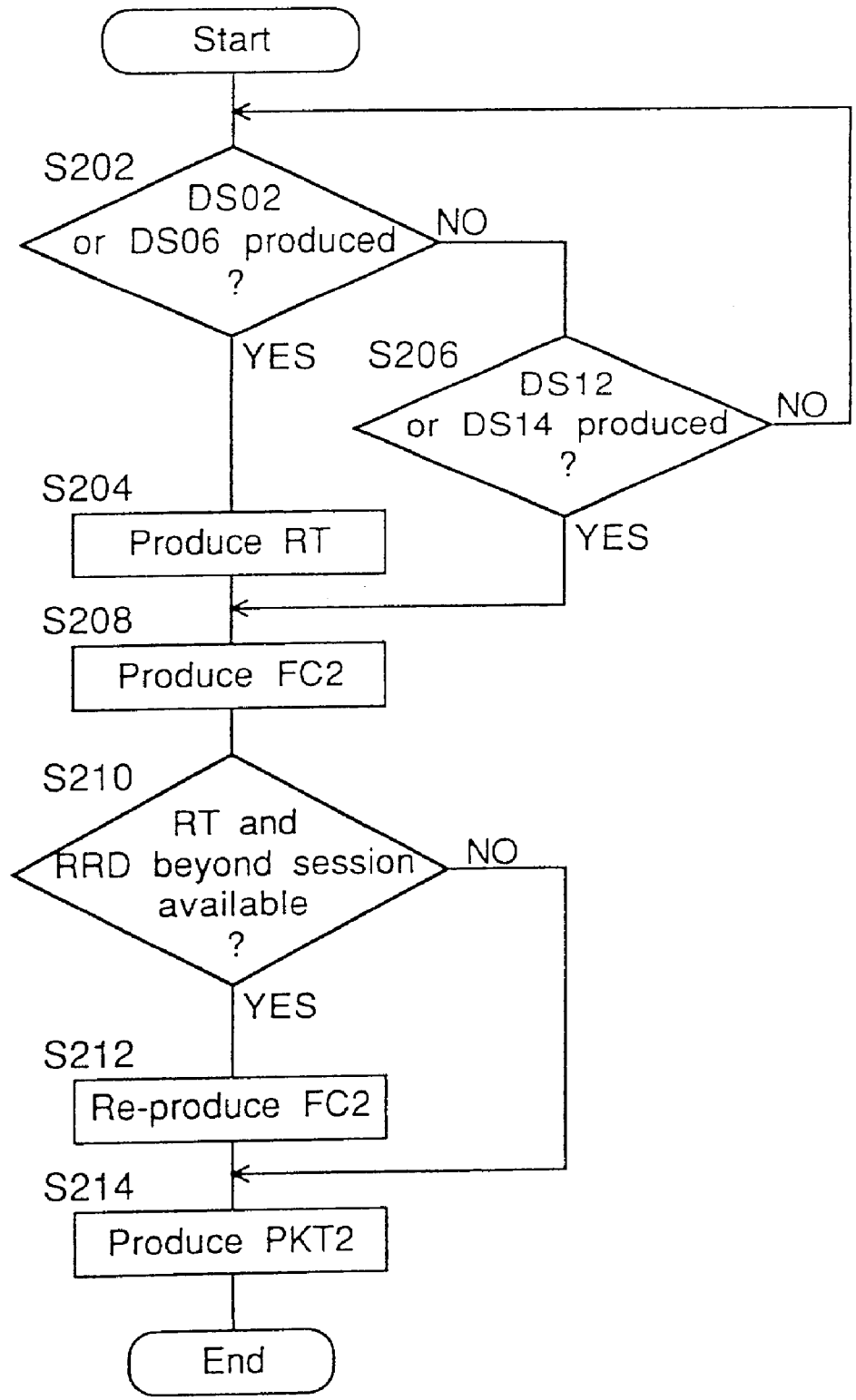
FIG. 5 is a flow chart of the details of the data recording subroutine in the flow chart shown in FIG. 2.
Figure 6:
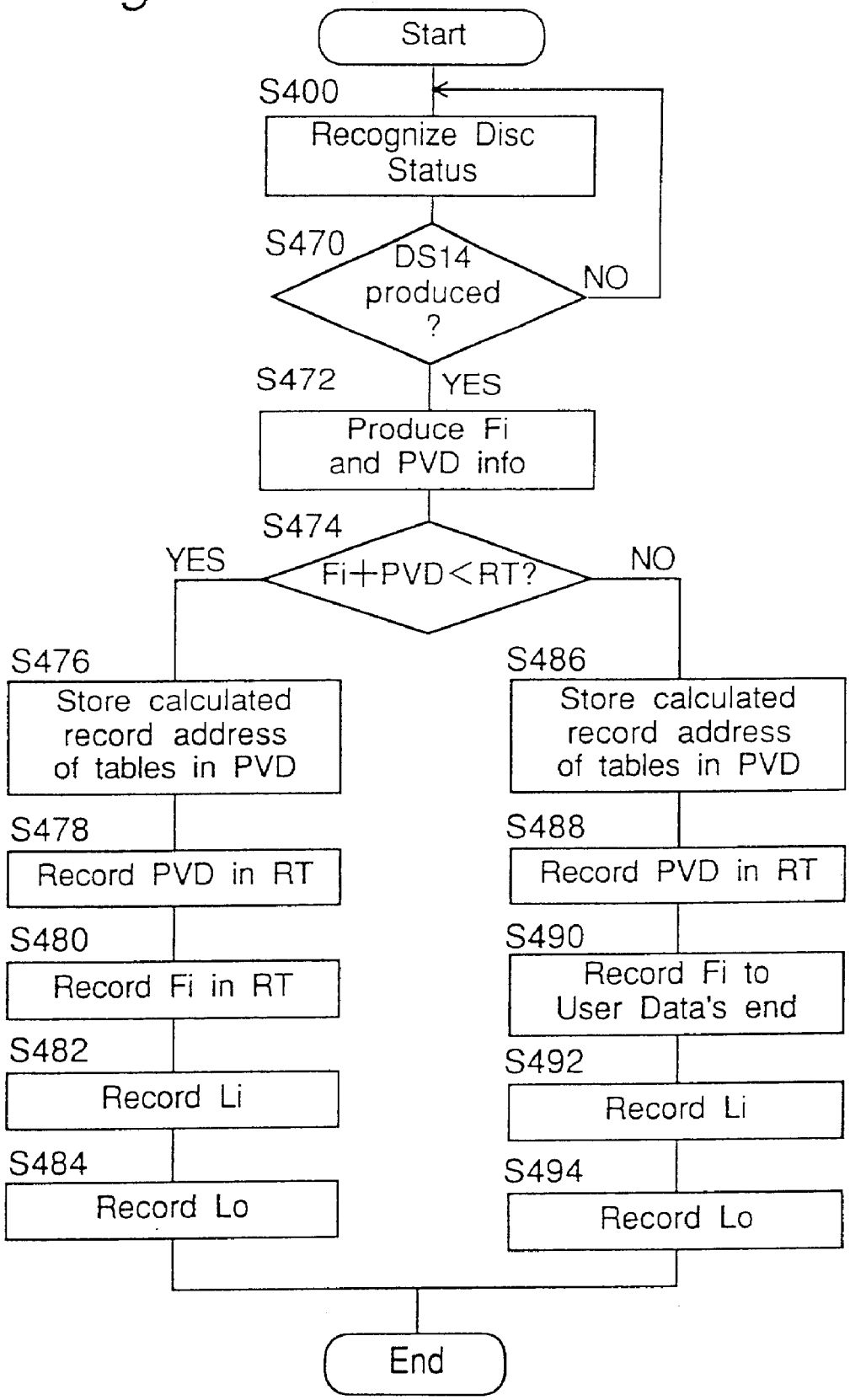
FIG. 6 is a flow chart of the details of the session creation subroutine in the flow chart shown in FIG. 2.

Referring next to FIG. 5, the Record Data subroutine of step #200 is described in detail below.

At step S202 it is determined whether disc status signal DS02 or disc status signal DS06 (S123 and S138) has been produced. If the result is YES, i.e., the disc is blank or a session has been completed, the procedure moves to step S204.

If the disc is blank based on the TOC information obtained in step S114 of the Recognize Disc Status subroutine #100, a reserved track RT is formed following the lead-in area Li, in other words, from the next address after the lead-in area is reserved after the lead-out area Lo, in step S204, and the procedure moves to step S208.

Based on the TOC information in memory 523, the track controller 517 calculates the next track recording position and creates the reserved track RT. Creating the reserved track RT is accomplished by the encoder 515 encoding the track information for the reserved track RT created by the track controller 517, and the recording and reproduction unit 511 recording the encoded track information to the PMA area.

However, if step S202 returns NO, the procedure moves to step S206.

At step S206 it is determined whether disc status signal DS12 or DS16 has been produced. If the result is YES, i.e., the disc is not reproducible but is recordable outside the session, or is recordable, the procedure moves to step S208.

However, if the result is NO, i.e., the disc is unrecorded (DS02), a session is completed (DS06), the disc is non-reproducible but recordable outside a session (DS12), or the disc is recordable (DS14), the procedure loops back to step S202.

The process thus loops through steps S202 and S206 until the disc is replaced with another disc and the disc status changes to any of the above states.

Based on the information (files and directory) in the data to be newly recorded, recording block information FC2 is produced in step S208 and the procedure moves to step S210. The file controller 519 produces and stores to memory 525 the management data FC2 for the data to be newly recorded.

Whether the status of the recording area beyond the session is that of the disc status signal DS14, which declares that the disc is a disc being normally recorded with a reserved track RT and reproducible append data present on the disc outside the session, is determined in step S210. If the result is YES, i.e., already-recorded data is present on the disc, the procedure moves to step S212.

At step S212 the management data FC2 produced in step S208 is combined with the management data FC1 of packet PKT1 (step S140) to re-produce the management data FC2, and the procedure moves to step S214. More specifically, the file controller 519 adds the management data FC1 for the already-recorded packet PKT1 to the management data FC2 relating only to the newly recorded data to produce the management data FC2 again. The resulting management data FC2 is then stored to memory 525.

At step S214 packet PKT2, i.e., file F2 and management data FC2, is recorded from the next sector after the end address of the already-recorded user data area obtained at step S145 of the Recognize Disc Status subroutine #100. More specifically, the file controller 519 sends the file F2 stored to memory 527 and the management data FC2 stored to memory 525 to the decoder 515. The signal decoded by the decoder 515 is then recorded to disc by the recording and reproduction unit 511.

On the other hand, if NO is returned by step S210, the procedure skips step S212 to step S214. The file F2 and management data FC2 containing only management information relating to the file F2 are thus recorded, and the process ends. The Complete Session subroutine #400 is described next in detail referring to FIG. 6.

The disc status is first recognized at step S400, and the procedure moves to step S470. Note that step S400 is identical to the Recognize Disc Status subroutine #100 described above, and further description is therefore omitted below.

At step S470 it is determined whether the disc status signal DS14 declaring that the disc is recordable was produced by step S400. If the result is NO, the process loops back to step S400. However, if the result is YES, the procedure moves to step S472. In other words, the process only advances to the next step when the disc is recordable.

The format information Fi and PVD information, including the path table and other structures conforming to the ISO-9660 standard, are produced in step S472 based on the management data FC1 for packet PKT1 obtained in step S140, and the procedure moves to step S474.

In other words, the file controller 519 produces the format information Fi and PVD conforming to the ISO-9660 standard based on the management data FC1 stored to memory 525. The resulting format information Fi and PVD are stored to memory 525.

At step S474 it is then determined whether the total of the format information Fi and PVD information conforming to the ISO-9660 standard is less than the available capacity of the reserved track RT. If YES is returned the procedure moves to step S476 to store both to the reserved track RT. However, if NO is returned, the procedure moves to step S486 to store the format information Fi outside the reserved track RT.

At step S476 the address for recording the format information Fi immediately after the PVD is calculated. The starting address of the format information Fi is obtained by adding sector 17, which is the area to which the PVD is recorded, to the starting address of the reserved track RT. Based on this address, the sizes of the Path Table PT and other tables are sequentially added to obtain each recording starting address. The obtained addresses are then stored to the field corresponding to the PVD, and the procedure moves to step S478.

Based on the information about the reserved track RT stored to the memory 521, the file controller 519 calculates the starting address of the format information Fi, and then calculates the recording address of each table constituting the format information Fi based on the calculated format information Fi starting address. The calculated recording addresses are stored to the field corresponding to the PVD in memory 525.

At step S478 a sixteen sector reserved area and the PVD conforming to the ISO-9660 standard are recorded continuously from the beginning of the reserved track RT, and the procedure then moves to step S480. The file controller 519 thus produces data for the 16-sector reserved area, and outputs this data together with the PVD stored to memory 525 to the encoder 515. The signal encoded by the encoder 515 is then recorded to the reserved track RT by the recording and reproduction unit 511.

At step S480 the format information Fi is recorded from the recording address of the format information Fi calculated in step S476. The remaining blank area in the reserved track RT is then padded with zeroes. After recording the procedure moves to step S482. In other words, the file controller 519 outputs the format information Fi stored to memory 525 to the encoder 515. The file controller 519 also generates the padding zeroes filling the remaining capacity in the reserved track RT after recording the format information Fi, and outputs the padding zeroes to the encoder 515 following continuously after the format information Fi. The signal encoded by the encoder 515 is then recorded to the reserved track RT by the recording and reproduction unit 511.

At step S482 the TOC information for recording to the lead-in area is produced. The track information obtained from the PMA in step S112, and the track information from the TOC of any existing session obtained from step S114, are used to produce the TOC information. The TOC information format conforms to the Orange Book. The resulting TOC information is recorded to the reserved lead-in area, and after producing the lead-in area the procedure moves to step S484.

More specifically the track controller 517 produces the TOC information used subsequently to create a session from the PMA information stored to memory 521 and the TOC information of any existing sessions stored to memory 523, and outputs the result to the encoder 515. The TOC information is created as lead-in data conforming to the Orange Book specification. The signal encoded by the encoder 515 is then recorded to the lead-in area of the disc by the recording and reproduction unit 511.

TOC information formatted according to the Orange Book specification for the lead-out area is produced in step S484 as in step S482. The resulting TOC information is recorded from the next sector after the end of the already-recorded user data to produce the lead-out area Lo. Recording the lead-out area ends the Complete Session subroutine #400.

More specifically, the track controller 517 produces the TOC information used subsequently to create a session from the PMA information stored to memory 521 and the TOC information of any existing sessions stored to memory 523, and outputs the result to the encoder 515. The TOC information is created as lead-out data conforming to the Orange Book specification. The signal encoded by the encoder 515 is then recorded to the lead-out area of the disc by the recording and reproduction unit 511.

As in step S476, the address for recording the format information Fi is calculated and the calculated address is stored to the PVD in step S486. Unlike step S486, however, the starting address from which the format information Fi is recorded is the sector following the end of the already-recorded user data. The address of each table in the format information Fi is then calculated based on this starting address, and stored to the PVD. When this process ends, the procedure moves to step S488.

In other words, the file controller 519 calculates the starting address of the format information Fi based on the information about the already-recorded user data area stored to the memory 521, and the recording address of each table in the format information Fi is calculated based on the calculated starting address. The obtained addresses are then stored to the field corresponding to the PVD in memory 525.

The process executed in step S488 records the PVD to the reserved track RT as in step S478 above. Because only the PVD is recorded to the reserved track RT, the remaining track area is padded with zeroes. After recording the procedure moves to step S490.

As in step S480, step S490 records the format information Fi. However, unlike step S480, the start recording address is the next sector following the end of the already-recorded user data area. After the process ends the procedure moves to step S492.

In other words, the file controller 519 outputs the format information Fi stored to memory 525 to the encoder 515. The signal encoded by the encoder 515 is then recorded from the end of the already-recorded user data area to the disc by the recording and reproduction unit 511.

At step S492 the TOC information for the lead-in area is produced and recorded as in step S482. The lead-in area is created by recording the TOC information, and the procedure moves to step S494.

At step S494 the TOC information for the lead-out area is produced and recorded as in step S484. Unlike step S484, however, the lead-out area Lo is recorded from the sector following the end of the format information Fi. The lead-out area is created by recording the TOC information, and recording the lead-out area ends the Complete Session subroutine #400.

Figure 7:
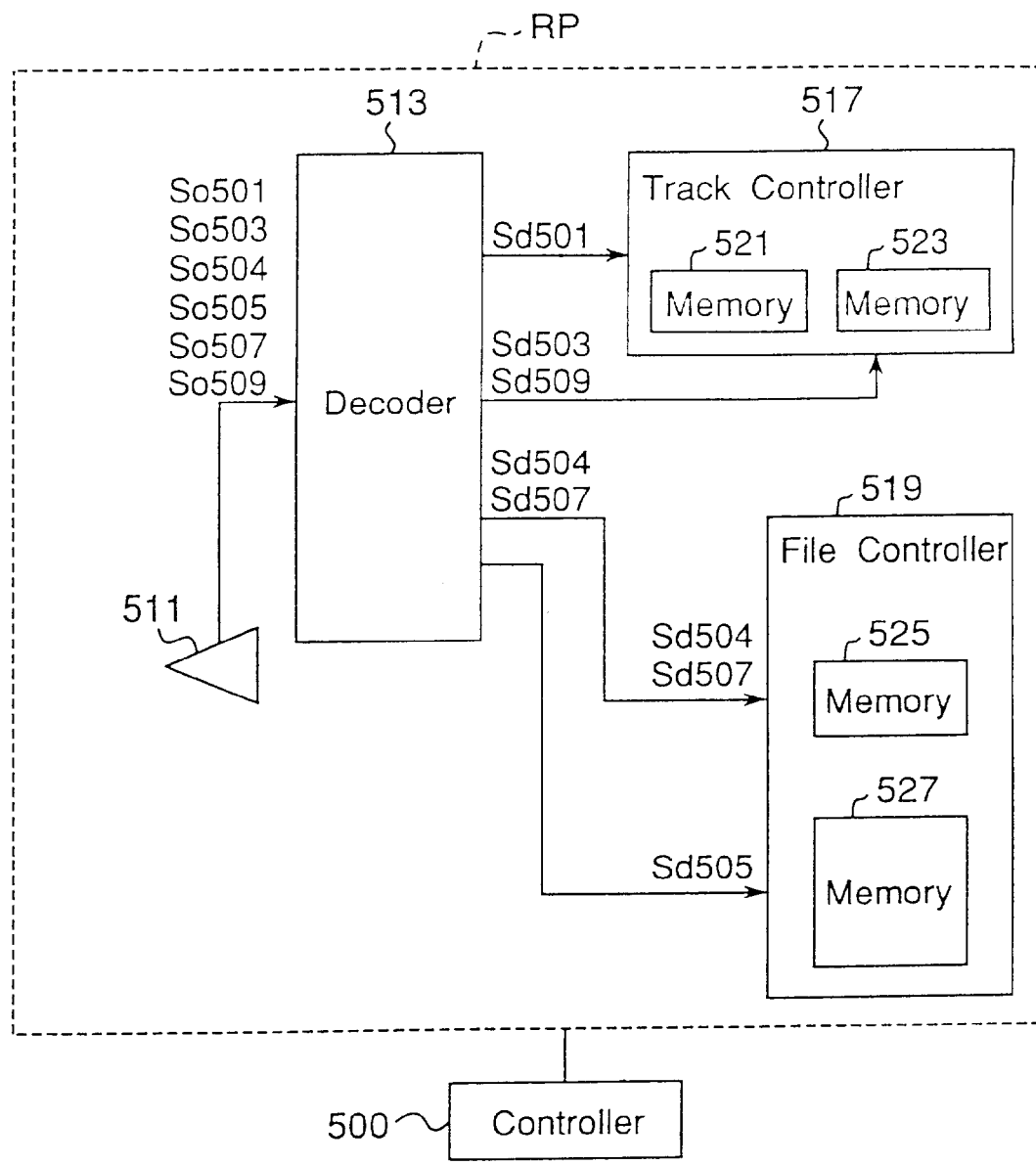
FIG. 7 is a block diagram showing the structure of a non-erasable media reproducing apparatus according to the present invention.

A reproduction apparatus RP for reading data from non-erasable media recorded by the non-erasable media recording apparatus RC according to the present invention is described next below with reference to FIG. 7. It should be noted that a CD-R disc is used as the non-erasable media in the present embodiment as in the recording apparatus RC described above. The non-erasable media reproduction apparatus RP can be achieved by removing the encoder 515 from the recording apparatus RC shown in FIG. 1. As a result, recording signals Si501, Si503, Si509, Si504, Si507, and Si505 are not output from the track controller 517 and file controller 519.

Figure 1:
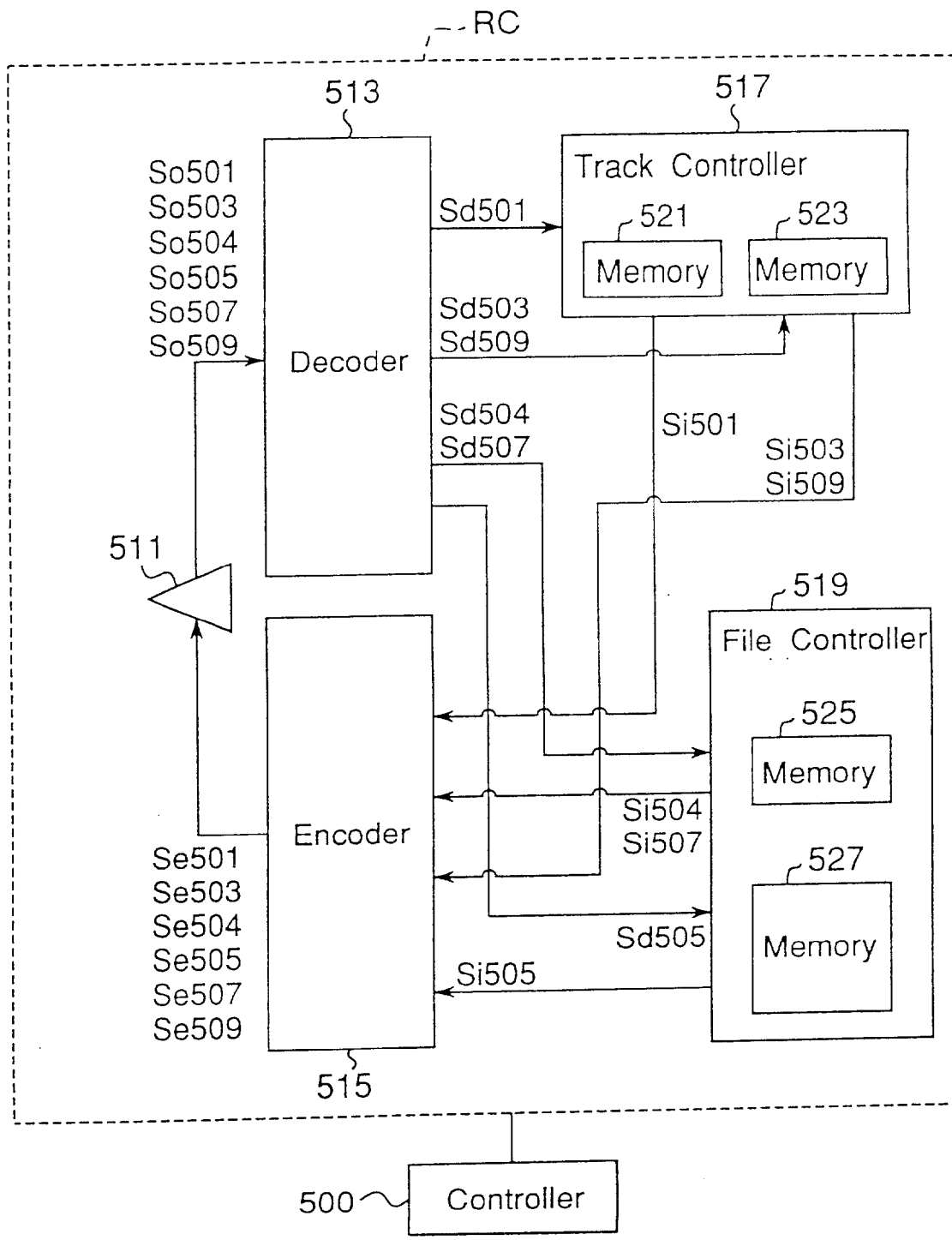
FIG. 1 is a block diagram showing the structure of a non-erasable media recording apparatus according to the present invention.

It should be further noted that while the present embodiment does not do any recording, the recording and reproduction unit 511 and controller 500 shown in FIG. 1 can be used as is.

Figure 8:
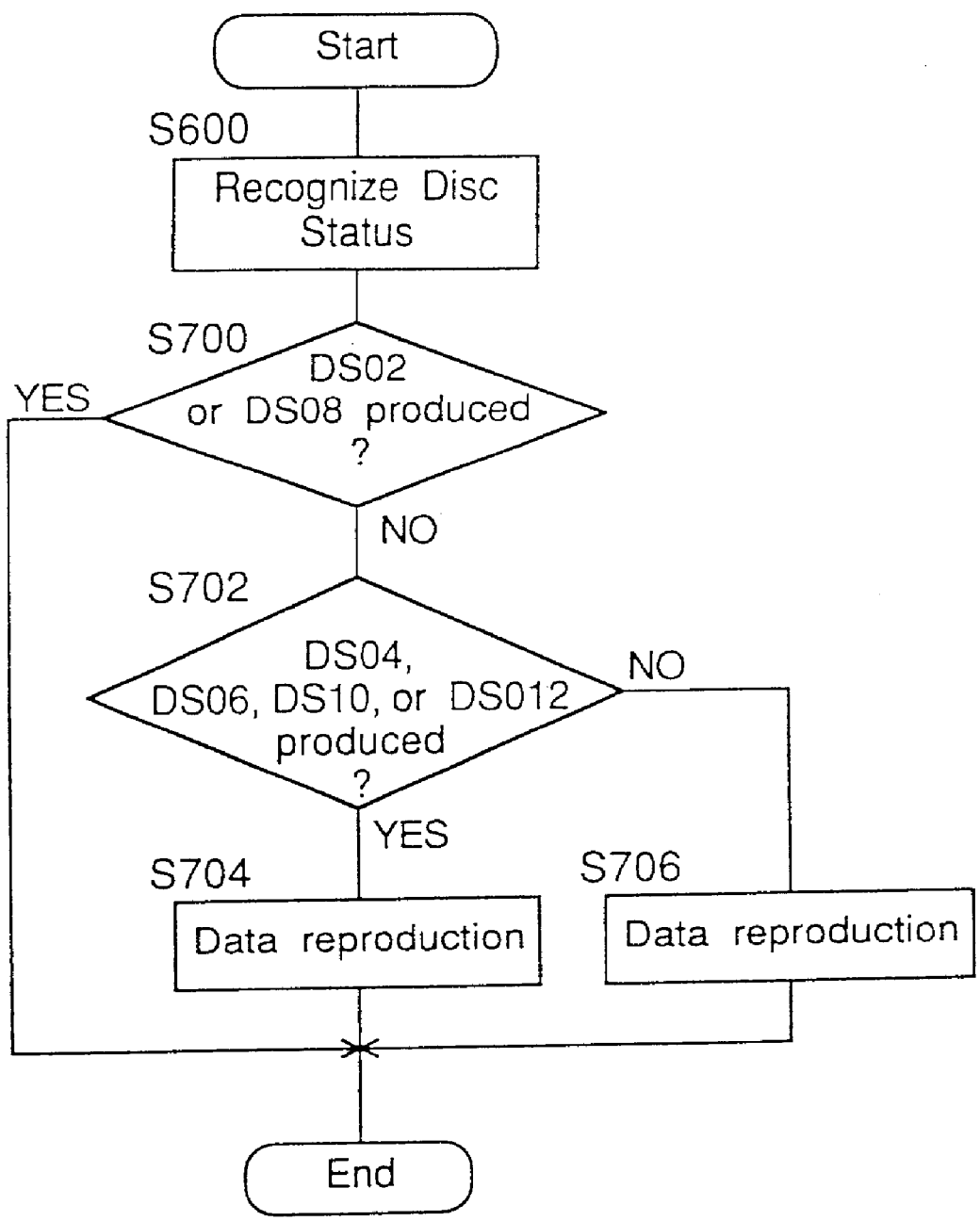
FIG. 8 is a flow chart of the operation of the non-erasable media reproducing apparatus shown in FIG. 7.

The operation of a non-erasable media reproduction apparatus RP according to the present invention for reproducing data from a recording medium recorded by the non-erasable media recording apparatus RC shown in FIG. 1 and described with reference to FIGS. 2, 3, 4, 5, and 6 above is described below with reference to FIG. 8.

The first step is to determine in step S600 the status of the disc to be reproduced. The procedure then advances to step S700. Note that the operation performed in step S600 is identical to the Recognize Disc Status subroutine #100 described above, and further description thereof is thus omitted below.

Whether the disc status signal DS02 declaring that the disc is unrecorded or blank, or the disc status signal DS08 similarly indicating that the disc is not reproducible, has been generated is then determined in step S700. If the result is YES the disc cannot be reproduced, and the process ends immediately. However, if the result is NO the procedure moves to step S702.

Whether any of the disc status signals DS04, DS06, DS10, or DS12 stating that the disc is reproducible has been generated is then determined by the controller 500 in step S702. If the result is YES, the procedure moves to step S704.

Based on the ISO-9660 standard information obtained from the PVD, data is then reproduced in step S704 using the same process used to reproduce a conventional single session CD-ROM or multi-session CD-R, and the process ends.

To reproduce ISO-9660 information, the location of the PVD is calculated from the first track address in the session obtained from the TOC, the address of the format information is then obtained from the content of the reproduced PVD, and the format information is reproduced. The reproduced format information is then analyzed according to the ISO-9660 standard. Analyzing the format information makes it possible to determine the file names and related information, as well as the recording positions on disc and the file sizes, and thus makes it possible to reproduce the user data files.

However, if step S702 returns NO, i.e., the disc status signal DS14 declaring that the disc is a normal disc in the process of being recording and thus contains in addition to a disc session a reserved track RT and reproducible data, the procedure moves to step S706.

At step S706 data is reproduced from a CD-R disc that has been written by the recording method and recording apparatus according to the present invention but on which a session has not been completed. The process then ends. It should be noted that the management information recorded with the data in each recording block is used for the file and directory information required for data reproduction, and not the format information of the ISO-9660 standard. As a result the management information analysis process is different from that used in step S704. The required management information is obtained in step S600 and, like in the ISO- 9660 standard, contains all required information relating to the user data. As a result, the user data can be reproduced in the same manner as a CD-ROM.

As described above, by storing the information that must be contained in the directory record with the data, data can be freely appended and reproduced until the disc is filled without completing a session. In addition, by completing the session, the disc can be reproduced by a conventional single session or multi-session compatible CD-ROM.

By means of the present invention, therefore, official public documents, acts of law, standards, encyclopedia, databases and other large documents that require regular or periodic modification or appending can be appended or edited even when recorded to non-erasable media. In other words, encyclopedia, public documents, and other types of data that are recorded to non-erasable media for publication and marketing can be easily updated by the end user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording apparatus for recording data in block units together with management information for said block units of data as a track in the recording area of a non-erasable recording medium, comprising:
   status detection means for detecting the recording status of said non-erasable recording medium, the status detection means detecting at least one of following:
      whether the recording medium is non-recordable;
      whether the recording medium is un-recorded;
      whether the recording medium is non-recordable but reproducible;
      whether the recording medium is non-recordable and non-reproducible; and
      whether the recording medium is recorded;
   means for reserving a particular part of said track for recording management information based on said detected recording status; and
   means for recording said management information to said reserved recording area.

2. A recording apparatus as claimed in claim 1 further comprising a first track information storage area for storing before the track, with regard to the recording sequence number, track information relating to said track.

3. A recording apparatus as claimed in claim 2 further comprising a second track information storage area for storing after the track, with regard to the recording sequence number, track information relating to said track.

4. A recording apparatus as claimed in claim 3, wherein said status detection means further detects whether the outside circumference side of said first and second track information storage means can be reproduced and recorded.

5. A recording apparatus as claimed in claim 3, wherein said status detection means further detects any one of the following statuses that:
   the outside circumference side of the first and second track information storage means can be reproduced and recorded, and
   a reserved track and reproducible data are recorded on the outside circumference side of the first and second track information storage means.

6. A recording apparatus as claimed in claim 5 comprising:
   a management information reading means for reading said management information based on said detected status,
   a management information generating means for generating management information of the recorded data based on said read management information,
   a data management information recording means for recording said data and said management information for said recorded data,
   a standard management information generating means for generating standard management information based on the ISO-9660 standard from said management information, and
   a standard management information recording means for recording said standard management information to said reserved track.

7. A recording apparatus as claimed in claim 6, wherein during track-at-once recording the management information for the recorded data is recorded and inserted to the start of the track.

8. A recording apparatus as claimed in claim 6, wherein during packet writing the management information for the recorded data is recorded and inserted to the end of the packet.

9. A recording method for recording data in block units together with management information for said block units of data as a track in the recording area of a non-erasable recording medium, comprising:
   detecting the recording status of the non-erasable recording medium, the status detection detecting at least one of the following:
      whether the recording medium is non-recordable;
      whether the recording medium is un-recorded;
      whether the recording medium is non-recordable but reproducible;
      whether the recording medium is both recordable and reproducible; and
      whether the recording medium is recorded;
   reserving a particular part of said track for recording management information based on the detected recording status; and
   recording the management information to the reserved recording area.

10. A recording method as claimed in claim 9 further providing a first track information storage area for storing before the track, with regard to the recording sequence number, track information relating to said track.

11. A recording method as claimed in claim 10 further providing a second track information storage area for storing after the track, with regard to the recording sequence number, track information relating to said track.

12. A recording method as claimed in claim 11, wherein status detection further detects whether the outside circumference side of the first and second track information storage means can be reproduced and recorded.

13. A recording method as claimed in claim 12, wherein said status detection further detects at least one of the following statuses that:
   the outside circumference side of the first and second track information storage means can be reproduced and recorded, and a reserved track and reproducible data are recorded on the outside circumference side of the first and second track information storage means.

14. A recording method as claimed in claim 13 further characterized by management information reading for reading the management information based on said detected status,
    management information generating for generating the management information of the recorded data based on the read management information,
    recording said data and said management information for said recorded data,
    standard management information generating for generating management information based on the ISO-9660 standard from said management information, and
    recording said standard management information to said reserved track.

15. A recording method as claimed in claim 14 characterized by recording said management information for the recorded data inserted to the start of the track during track-at-once recording.

16. A recording method as claimed in claim 14 characterized by recording said management information for said recorded data inserted to the end of the packet during packet writing recording.

17. A recording apparatus for recording data in block units together with management information for said block units of data as a track in the recording area of a non-erasable recording medium, and a reproduction apparatus for reproducing recorded data from the non-erasable recording medium, comprising:
    status detection means for detecting the recording status of said non-erasable recording medium;
    means for reserving a particular part of said track for recording management information based on said detected recording status;
    means for recording said management information to said reserved recording area;
    first recording status detection means for detecting at least one of the following:
        whether said recording status of the non-erasable recording medium is unrecorded, and
        whether said recording status of the non-erasable recording medium is non-reproducible; and
    second recording status detection means for detecting at least one of the following:
        whether said non-erasable recording medium is non-recordable but reproducible,
        whether said non-erasable recording medium is recordable and reproducible, and
        whether the outside circumference side of said first and second track information storage means is recordable and reproducible.

18. A reproduction apparatus as claimed in claim 17 further comprising a data reproduction means for reproducing recorded data from the track contained by said first and second track information storage means based on said standard management information when said first recording status detection means detects a status.

19. A reproduction apparatus as claimed in claim 17 further comprising a data reproduction means for reproducing recorded data from the track based on said management information, detected recording status, management information, standard management information, and first track information when said second recording status detection means detects a status.

20. A recording method for recording data in block units together with management information for the block units of data as a track in the recording area of a non-erasable recording medium, and a reproduction method for reproducing recorded data recorded by the recording method, comprising:
    detecting the recording status of the non-erasable recording medium;
    reserving a particular portion of the track for recording management information based on the detected recording status;
    recording the management information to the reserved recording area;
    detecting a first recording status to detect at least one of the following:
        whether non-erasable recording medium is unrecorded,
        whether said non-erasable recording medium is non-reproducible, and
    detecting a second recording status to detect at least one of the following:
        whether said non-erasable recording medium is non-recordable but reproducible, and
        whether the outside circumference side of said first and second track information storage means is recordable and reproducible.

21. A reproduction method as claimed in claim 20 further characterized by data reproducing, recorded data, from the track contained by said first and second track information storage means based on said standard management information when the status is detected by said first recording status detecting step.

22. A reproduction method as claimed in claim 20 further characterized by reproducing recorded data from the track based on said management information, detected recording status, management information, standard management information, and first track information when the status is detected by said second recording status detecting step.

23. A recording apparatus for recording data in block units together with management information for the block units of data as a track in the recording area of a non-erasable recording medium, comprising:
    status detection means for detecting the recording status of the non-erasable recording medium;
    means for reserving a particular part of the track for recording said management information based on said detected recording status; and
    means for recording the management information to the reserved recording area; the management information recorded with the data in the recording blocks being recorded as the file and directory information required for data reproduction, and not the format information of the ISO-9660 standard.

* * * * *

UNITED STATES PATENT AND TRADEMARK OFFICE
CERTIFICATE OF CORRECTION

PATENT NO. :  5,940,853
DATED      :  August 17, 1999
INVENTOR(S) : Y. OOI et al.

It is certified that error appears in the above-identified patent and that said Letters Patent is hereby corrected as shown below:

On the cover of the printed patent, at item [56], References Cited, the following FOREIGN PATENT DOCUMENT was omitted and should be included:

4274030     9/1992     Japan

Signed and Sealed this

Twenty-fourth Day of October, 2000

*Attest:*

Q. TODD DICKINSON

*Attesting Officer*     *Director of Patents and Trademarks*